US012020613B2

(12) United States Patent
Seo

(10) Patent No.: US 12,020,613 B2
(45) Date of Patent: Jun. 25, 2024

(54) DISPLAY APPARATUS INCLUDING FIRST AND SECOND BACK GATE SIGNAL APPLYING LINES AND METHOD OF DRIVING THE SAME

(71) Applicant: SAMSUNG DISPLAY CO., LTD., Yongin-si (KR)

(72) Inventor: Hae-Kwan Seo, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/309,751

(22) Filed: Apr. 28, 2023

(65) Prior Publication Data

US 2023/0267864 A1 Aug. 24, 2023

Related U.S. Application Data

(62) Division of application No. 16/918,377, filed on Jul. 1, 2020, now Pat. No. 11,640,777.

(30) Foreign Application Priority Data

Jul. 26, 2019 (KR) ........................ 10-2019-0090940

(51) Int. Cl.
*G09G 3/00* (2006.01)
*G09G 3/3266* (2016.01)
*G09G 3/3275* (2016.01)

(52) U.S. Cl.
CPC ........... *G09G 3/035* (2020.08); *G09G 3/3266* (2013.01); *G09G 3/3275* (2013.01);
(Continued)

(58) Field of Classification Search
CPC .... G09G 3/035; G09G 3/2085; G09G 3/2088; G09G 3/2092; G09G 3/2096; G09G 3/30;
(Continued)

(56) References Cited

U.S. PATENT DOCUMENTS 9,830,855 B1 11/2017 Li
11,037,498 B2 6/2021 Seo et al.
(Continued)

FOREIGN PATENT DOCUMENTS

CN 101217026 A 7/2008
CN 104751762 A 7/2015
(Continued)

OTHER PUBLICATIONS

U.S. Office Action dated Nov. 3, 2020, issued in U.S. Appl. No. 16/880,655 (8 pages).
(Continued)

*Primary Examiner* — Keith L Crawley
(74) *Attorney, Agent, or Firm* — Lewis Roca Rothgerber Christie LLP

(57) ABSTRACT

A display apparatus includes: a first display area, a second display area, a first back gate signal applying line connected to back gate electrodes of pixels in the first display area and a second back gate signal applying line connected to back gate electrodes of pixels in the second display area; a back gate signal generator configured to generate a first back gate signal applied to the back gate electrodes of the pixels in the first display area and a second back gate signal applied to the back gate electrodes of the pixels in the second display area; a gate driver configured to output a gate signal; a data driver configured to output a data voltage; and a driving controller configured to control a driving timing, wherein the driving controller, the data driver and the back gate signal generator form an integrated driver.

13 Claims, 20 Drawing Sheets

(52) U.S. Cl.
CPC ............... *G09G 2310/0221* (2013.01); *G09G 2310/0243* (2013.01); *G09G 2310/027* (2013.01); *G09G 2310/08* (2013.01); *G09G 2330/028* (2013.01); *G09G 2380/02* (2013.01)

(58) Field of Classification Search
CPC .. G09G 3/3208; G09G 3/3225; G09G 3/3233; G09G 3/325; G09G 3/3266; G09G 3/3275; G09G 3/3291; G09G 2300/043; G09G 2300/08; G09G 2300/0809; G09G 2300/0814; G09G 2300/0828; G09G 2310/0218; G09G 2310/0221; G09G 2310/0243; G09G 2310/027; G09G 2310/04; G09G 2310/061; G09G 2310/062; G09G 2310/08; G09G 2330/028; G09G 2380/02; H10K 59/12–1315
See application file for complete search history.

(56) References Cited

U.S. PATENT DOCUMENTS

| | | | |
|---|---|---|---|
| 2008/0165109 | A1 | 7/2008 | Joo et al. |
| 2012/0169707 | A1 | 7/2012 | Ebisuno et al. |
| 2012/0169798 | A1 | 7/2012 | Ebisuno |
| 2013/0069068 | A1 | 3/2013 | Miyake |
| 2014/0028659 | A1 | 1/2014 | Yamazaki et al. |
| 2014/0028859 | A1 | 1/2014 | Kim et al. |
| 2015/0187321 | A1 | 7/2015 | Kim et al. |
| 2016/0293655 | A1 | 10/2016 | Yoneda et al. |
| 2016/0313769 | A1 | 10/2016 | Yoshitani et al. |
| 2017/0352313 | A1 | 12/2017 | Miyake |
| 2018/0088699 | A1 | 3/2018 | Dao et al. |
| 2018/0268774 | A1 | 9/2018 | Kim et al. |
| 2018/0374425 | A1 | 12/2018 | Jeong et al. |
| 2019/0019458 | A1 | 1/2019 | Teraguchi |
| 2020/0202774 | A1 * | 6/2020 | Cho .................... H10K 77/111 |
| 2020/0357362 | A1 | 11/2020 | Shin et al. |
| 2021/0027719 | A1 | 1/2021 | Cho et al. |

FOREIGN PATENT DOCUMENTS

| | | | |
|---|---|---|---|
| CN | 109102776 | A | 12/2018 |
| KR | 10-2016-0057028 | A | 5/2016 |
| KR | 10-2016-0108705 | A | 9/2016 |
| KR | 10-2017-0137632 | A | 12/2017 |
| KR | 10-1910111 | B1 | 10/2018 |
| KR | 10-2018-0135434 | A | 12/2018 |

OTHER PUBLICATIONS

U.S. Notice of Allowance dated Feb. 19, 2021, issued in U.S. Appl. No. 16/880,655 (8 pages).

Chinese Office Action dated Mar. 27, 2024, issued in corresponding Chinese Patent Application No. 202010733925.2 (13 pages).

* cited by examiner

DISPLAY APPARATUS INCLUDING FIRST AND SECOND BACK GATE SIGNAL APPLYING LINES AND METHOD OF DRIVING THE SAME

CROSS-REFERENCE TO RELATED APPLICATIONS

This application is a divisional of U.S. patent application Ser. No. 16/918,377, filed Jul. 1, 2020, which claims priority to and the benefit of Korean Patent Application No. 10-2019-0090940, filed Jul. 26, 2019, the entire content of both of which is incorporated herein by reference.

BACKGROUND

1. Field

Aspects of some example embodiments of the present inventive concept relate to a display apparatus and a method of driving the display apparatus.

2. Description of the Related Art

Generally, a display apparatus includes a display panel and a display panel driver. The display panel includes a plurality of gate lines, a plurality of data lines, a plurality of emission lines and a plurality of pixels. The display panel driver includes a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver and the emission driver.

A foldable display apparatus has been developed using a flexible display panel. The foldable display apparatus may have at least two display areas. The display areas may be formed in a single flexible display panel.

Various display areas among the display areas may be inactive or active, depending on whether the display apparatus is in a folded or an unfolded condition or status. When a display area is inactive, a black image may be displayed at the inactive area. Although a black image may be displayed on the inactive area, some amount of power may still be consumed.

The above information disclosed in this Background section is only for enhancement of understanding of the background and therefore the information discussed in this Background section does not necessarily constitute prior art.

SUMMARY

Aspects of some example embodiments of the present inventive concept relate to a display apparatus and a method of driving the display apparatus. For example, some example embodiments of the present inventive concept relate to a foldable display apparatus and a method of driving the display apparatus.

Aspects of some example embodiments of the present inventive concept include a display apparatus that may be capable of reducing a power consumption.

Aspects of some example embodiments of the present inventive concept may also include a method of driving a display apparatus.

According to some example embodiments of a display apparatus according to the present inventive concept, the display apparatus includes a display panel, a back gate signal generator, a gate driver, a data driver and a driving controller. The display panel includes a first display area, a second display area, a first back gate signal applying line connected to back gate electrodes of pixels in the first display area and a second back gate signal applying line connected to back gate electrodes of pixels in the second display area. The back gate signal generator is configured to generate a first back gate signal applied to back gate electrodes of the pixels in the first display area and a second back gate signal applied to back gate electrodes of the pixels in the second display area. The gate driver is configured to output a gate signal to a gate line of the display panel. The data driver is configured to output a data voltage to a data line of the display panel. The driving controller is configured to control a driving timing of the gate driver and a driving timing of the data driver. The driving controller, the data driver and the back gate signal generator form an integrated driver.

According to some example embodiments, the integrated driver may include a back gate reference voltage generator configured to generate a back gate reference voltage and a first digital to analog converter configured to convert a back gate digital signal received from the driving controller to the first back gate signal having an analog type and the second back gate signal having an analog type based on the back gate reference voltage.

According to some example embodiments, the integrated driver may further include a gamma reference voltage generator configured to generate a gamma reference voltage and a second digital to analog converter configured to convert a data signal received from the driving controller to the data voltage having an analog type.

According to some example embodiments, the first back gate signal and the second back gate signal may be adjusted in a unit of a horizontal line of input image data.

According to some example embodiments, the integrated driver may include a reference voltage generator configured to generate a back gate reference voltage and a gamma reference voltage generator and a digital to analog converter configured to convert a back gate digital signal received from the driving controller to the first back gate signal having an analog type and the second back gate signal having an analog type based on the back gate reference voltage, and convert a data signal received from the driving controller to the data voltage having an analog type.

According to some example embodiments, the first back gate signal and the second back gate signal may be adjusted in a unit of a horizontal line of input image data.

According to some example embodiments, the integrated driver may include a gamma reference voltage generator configured to generate a gamma reference voltage. The data driver may be configured to convert a data signal to the data voltage based on the gamma reference voltage and output the data voltage to the display panel. The integrated driver may further include a voltage regulator configured to receive information regarding a level of the first back gate signal and a level of the second back gate signal and generate the first back gate signal and the second back gate signal.

According to some example embodiments, the display apparatus may further include a power voltage generator configured to generate a high power voltage and a low power voltage applied to the pixel of the display panel. The power voltage generator may be formed independently from the voltage regulator.

According to some example embodiments, the first back gate signal and the second back gate signal may be adjusted in a unit of a frame of input image data.

According to some example embodiments, the integrated driver may include an output pad configured to output the first back gate signal to the first back gate signal applying line and the second back gate signal to the second back gate signal applying line.

According to some example embodiments of a display apparatus according to the present inventive concept, the display apparatus includes a display panel, a gate driver, a data driver, a driving controller and a power voltage generator. The display panel includes a first display area, a second display area, a first back gate signal applying line connected to back gate electrodes of pixels in the first display area and a second back gate signal applying line connected to back gate electrodes of pixels in the second display area. The gate driver is configured to output a gate signal to a gate line of the display panel. The data driver is configured to output a data voltage to a data line of the display panel. The driving controller is configured to control a driving timing of the gate driver and a driving timing of the data driver. The power voltage generator is configured to generate a first back gate signal applied to back gate electrodes of the pixels in the first display area, a second back gate signal applied to back gate electrodes of the pixels in the second display area and a high power voltage and a low power voltage applied to the pixel of the display panel. The driving controller and the data driver form an integrated driver. The power voltage generator is formed independently from the integrated driver.

According to some example embodiments, the first back gate signal and the second back gate signal may be adjusted in a unit of a frame of input image data.

According to some example embodiments, the integrated driver may include a control pad configured to output information regarding a level of the first back gate signal and a level of the second back gate signal to the power voltage generator, an input pad configured to receive the first back gate signal and the second back gate signal from the power voltage generator and an output pad configured to output the first back gate signal to the first back gate signal applying line and the second back gate signal to the second back gate signal applying line.

According to some example embodiments of a display apparatus according to the present inventive concept, the display apparatus includes a display panel, a power voltage generator, a gate driver and a data driver. The display panel includes a first display area, a second display area, a first back gate signal applying line connected to back gate electrodes of pixels in the first display area and a second back gate signal applying line connected to back gate electrodes of pixels in the second display area. The power voltage generator is configured to generate a first back gate signal applied to the first back gate signal applying line and a second back gate signal to the second back gate signal applying line. The gate driver is configured to output a gate signal to a gate line of the display panel. The data driver is configured to output a data voltage to a data line of the display panel. The data driver is configured to once output black data to the data line when the display panel is folded. The second back gate signal increases from a normal level to an inactive level greater than the normal level and at least one of the gate driver, the data driver, or an emission driver does not output a driving signal to the second display area when the display panel is folded and after the black data is once output.

According to some example embodiments, a current of the pixel of the display panel may be sensed when the display panel maintains a folded status. The data driver may be configured to output the black data to the data line again when the sensed current does not maintain the black data.

According to some example embodiments, the data driver may include a plurality of main buffers respectively connected to the data lines and a supplementary buffer commonly connected to the data lines.

According to some example embodiments, the data driver may further include a plurality of switches. The switch may be configured to selectively connect one of the main buffer and the supplementary buffer to the data line.

According to some example embodiments, the data driver may be configured to output the black data to the data line again using the supplementary buffer when the sensed current does not maintain the black data.

According to some example embodiments, a current of the pixel of the display panel may be sensed when the display panel maintains a folded status. The back gate signal generator may be configured to increase the second back gate signal when the sensed current does not maintain the black data.

According to some example embodiments, the data driver may be configured to output the black data to the data line again when the second back gate signal increases and the increased second back gate signal exceeds a maximum back gate voltage.

According to some example embodiments, the back gate signal may decrease from the inactive level to the normal level when the display panel is unfolded from a folded status.

According to some example embodiments of a method of driving a display apparatus according to the present inventive concept, the method includes outputting a first back gate signal to a first back gate signal applying line connected to back gate electrodes of pixels in a first display area of a display panel, outputting a second back gate signal to a second back gate signal applying line connected to back gate electrode of pixels in a second display area of the display panel, outputting a gate signal to a gate line of the display panel and outputting a data voltage to a data line of the display panel. A data driver is configured to once output black data to the data line when the display panel is folded. The second back gate signal increases from a normal level to an inactive level greater than the normal level and at least one of a gate driver, the data driver, or an emission driver does not output a driving signal to the second display area when the display panel is folded and after the black data is once output.

In a display apparatus and a method of driving the display apparatus according to some example embodiments, independent back gate signals may be applied to first back gate electrodes located in the first display area and second back gate electrodes located in the second display area so that the pixels in the inactive area may be controlled not to emit the light. In addition, the gate driver may not output the gate signal to the inactive area, the data driver does not output the data voltage to the inactive area and the emission driver does not output the emission signal to the inactive area in a folded status of the display panel. Thus, the power consumption of the display apparatus may be reduced.

In addition, in the folded state of the display panel, the current of pixels may be sensed. When the luminance of a pixel increases due to leakage of the current of the pixel, the black data may be output to the inactive area.

In addition, a supplementary buffer commonly connected to the data lines may be used to output the black data to the inactive area so that the power consumption of the display apparatus may be further reduced.

BRIEF DESCRIPTION OF THE DRAWINGS

The above and other features and characteristics of the present inventive concept will become more apparent by describing in more detail aspects of some example embodiments thereof with reference to the accompanying drawings, in which.

DETAILED DESCRIPTION

Hereinafter, aspects of some example embodiments of the present inventive concept will be explained in more detail with reference to the accompanying drawings.

Figure 1:
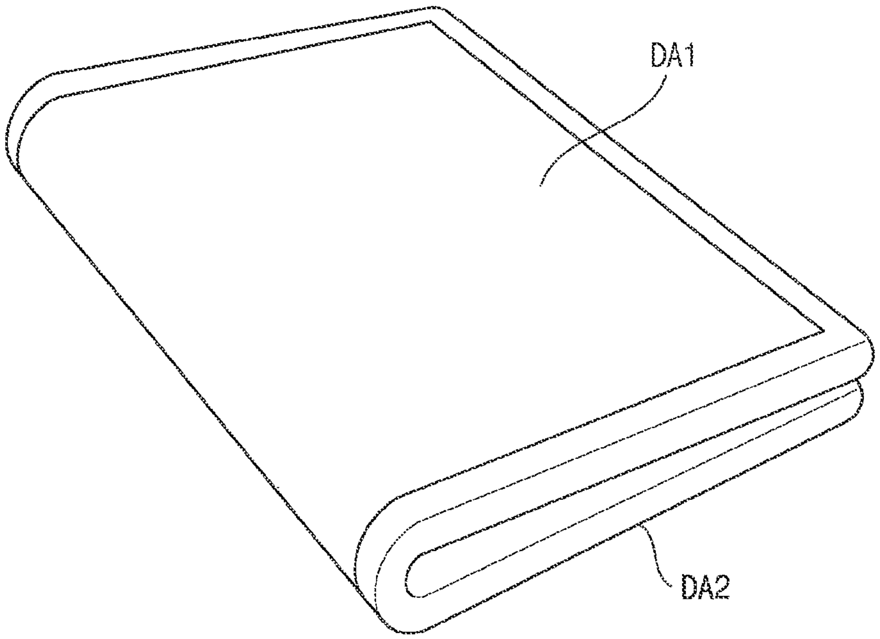
FIG. 1 is a perspective view illustrating a display apparatus according to some example embodiments of the present inventive concept.
Figure 2:
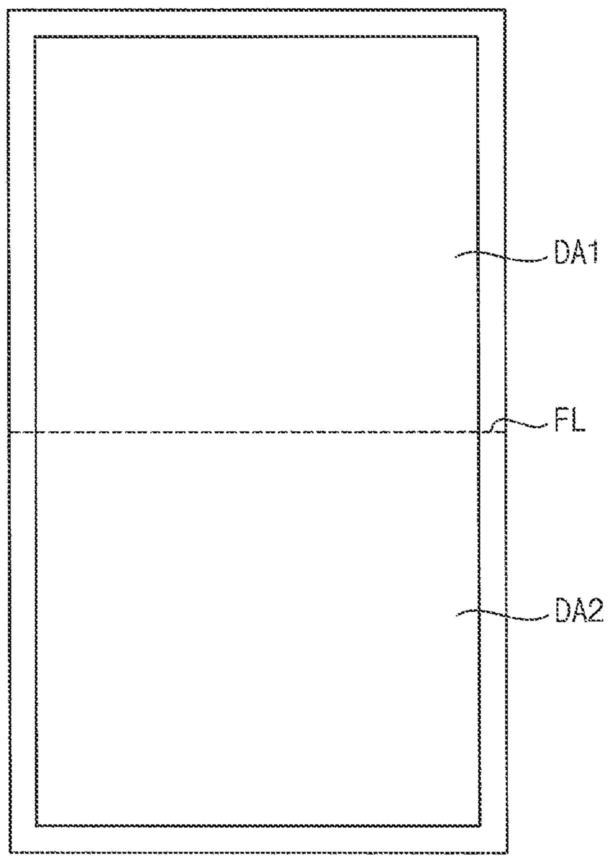
FIG. 2 is a plan view illustrating the display apparatus of FIG. 1.

FIG. 1 is a perspective view illustrating a display apparatus in a folded state or condition, according to some example embodiments of the present inventive concept. FIG. 2 is a plan view illustrating the display apparatus of FIG. 1 in an unfolded state or condition.

Referring to FIGS. 1 and 2, the display apparatus may include a flexible display panel. The display apparatus may be a foldable display apparatus. The display apparatus may be folded along a folding line FL.

The display apparatus may include a first display area DA1 located at a first side of the folding line FL and a second display area DA2 located at a second side of the folding line FL.

When the display apparatus is folded as shown in FIG. 1, the first display area DA1 may display an image and the second display area DA2 may not display an image. Alternatively, when the display apparatus is folded as shown in FIG. 1, the second display area DA2 may display an image and the first display area DA1 may not display an image according to a user setting. That is, according to some embodiments, when the display apparatus is in a folded condition or state, depending on the user-defined settings of the display apparatus, either the first display area DA1 or the second display area DA2 may be configured to not display images.

Figure 3:
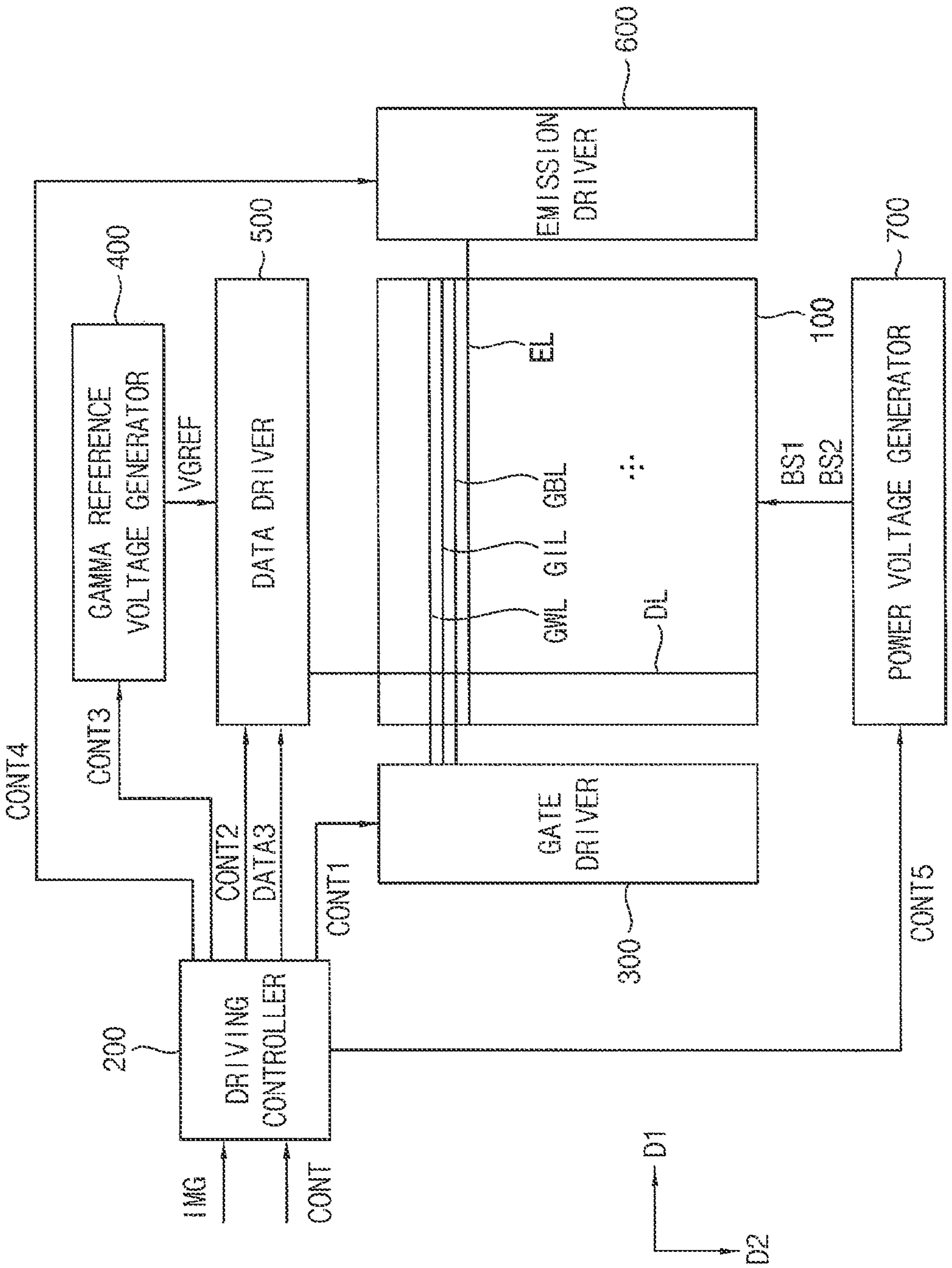
FIG. 3 is a block diagram illustrating the display apparatus of FIG. 1.

FIG. 3 is a block diagram illustrating the display apparatus of FIG. 1.

Referring to FIGS. 1 to 3, the display apparatus includes a display panel 100 and a display panel driver. The display panel driver includes a driving controller 200, a gate driver 300, a gamma reference voltage generator 400, a data driver 500, an emission driver 600 and a power voltage generator 700.

The display panel 100 has a display region on which an image is displayed and a peripheral region adjacent to the display region.

The display panel 100 includes a plurality of gate lines GWL, GIL and GBL, a plurality of data lines DL, a plurality of emission lines EL and a plurality of pixels electrically connected to the gate lines GWL, GIL and GBL, the data lines DL and the emission lines EL. The gate lines GWL, GIL and GBL extend in a first direction D1, the data lines DL extend in a second direction D2 crossing the first direction D1 and the emission lines EL extend in the first direction D1. Although FIG. 3 illustrates a single data line DL, emission line EL, and gate line GWL, GIL, and GBL, embodiments of the present invention are not limited thereto, and the number of lines may vary according to the design and characteristics of the display panel 100.

According to some example embodiments, the display panel 100 may include the first display area DA1, the second display area DA2, a first back gate signal applying line connected to back gate electrodes of pixels in the first display area DA1 and a second back gate signal applying line connected to back gate electrodes of pixels in the second display area DA2.

The driving controller 200 receives input image data IMG and an input control signal CONT from an external apparatus or external source. For example, the input image data IMG may include red image data, green image data, and blue image data. The input image data IMG may include white image data. The input image data IMG may include magenta image data, cyan image data, and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4, a fifth control signal CONT5, and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The driving controller 200 generates the fifth control signal CONT5 for controlling an operation of the power voltage generator 700 based on the input control signal CONT, and outputs the fifth control signal CONT5 to the power voltage generator 700.

The gate driver 300 generates gate signals driving the gate lines GWL, GIL and GBL in response to the first control signal CONT1 received from the driving controller 200. The gate driver 300 may sequentially output the gate signals to the gate lines GWL, GIL and GBL. For example, the gate driver 300 may be mounted on the peripheral region of the display panel 100. For example, the gate driver 300 may be integrated on the peripheral region of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

According to some example embodiments, the gamma reference voltage generator 400 may be located in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The emission driver 600 generates emission signals to drive the emission lines EL in response to the fourth control signal CONT4 received from the driving controller 200. The emission driver 600 may output the emission signals to the emission lines EL.

The power voltage generator 700 may generate a first back gate signal BS1 which is applied to the first back gate signal applying line and a second back gate signal BS2 which is applied to the second back gate signal applying line in response to the fifth control signal CONT5 received from the driving controller 200. Hereinafter, the power voltage generator 700 may be referred to a back gate signal generator and a voltage regulator according to some example embodiments.

In addition, the power voltage generator 700 may generate a high power voltage and a low power voltage of the organic light emitting element of the display panel 100 and output the high power voltage and the low power voltage to the display panel 100.

Figure 4:
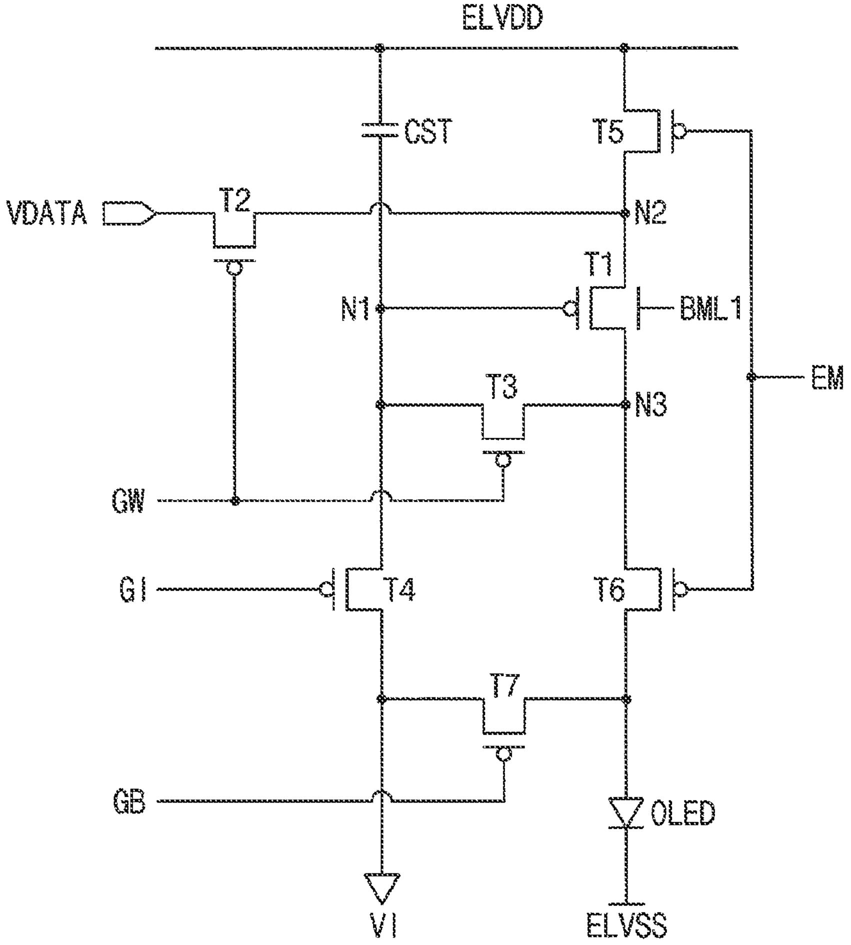
FIG. 4 is a circuit diagram illustrating a pixel of a display panel of FIG. 3.
Figure 5:
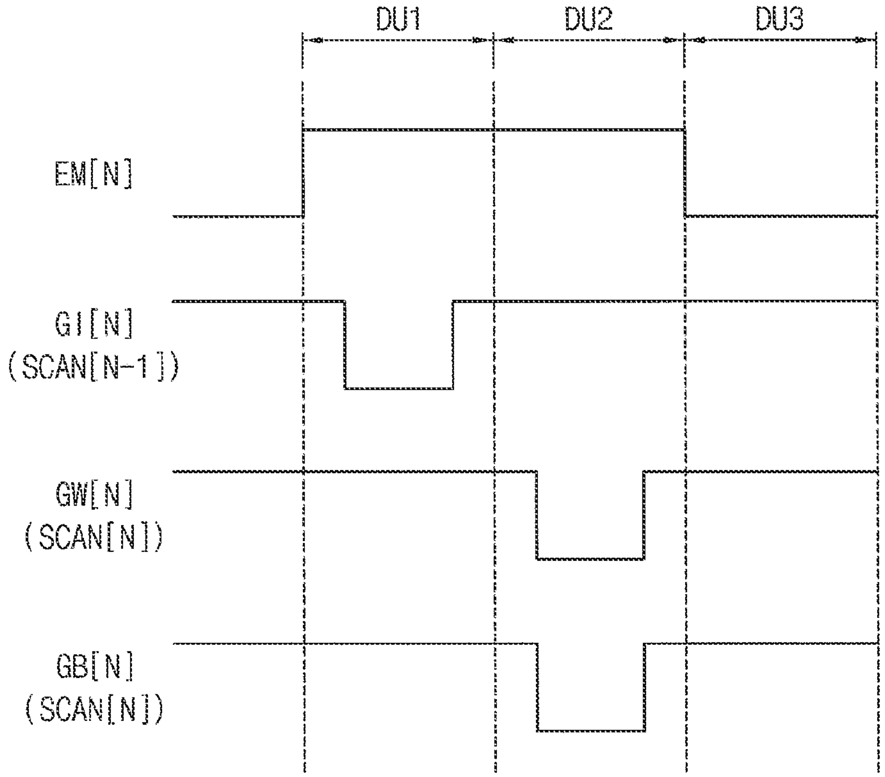
FIG. 5 is a timing diagram illustrating input signals applied to the pixel of FIG. 4.

FIG. 4 is a circuit diagram illustrating a pixel of the display panel 100 of FIG. 3. FIG. 5 is a timing diagram illustrating input signals applied to the pixel of FIG. 4.

Referring to FIGS. 1 to 5, the display panel 100 includes a plurality of pixels. Each pixel includes the organic light emitting element OLED.

The pixel receives a data write gate signal GW, a data initialization gate signal GI, an organic light emitting element initialization gate signal GB, the data voltage VDATA and the emission signal EM and the organic light emitting element OLED of the pixel emits light corresponding to the level of the data voltage VDATA to display the image.

At least one of the pixels may include first to seventh pixel switching elements T1 to T7, a storage capacitor CST and the organic light emitting element OLED.

The first pixel switching element T1 includes a control electrode connected to a first node N1, an input electrode connected to a second node N2 and an output electrode connected to a third node N3.

For example, the first pixel switching element T1 may be a P-type thin film transistor. The control electrode of the first pixel switching element T1 may be a gate electrode. The input electrode of the first pixel switching element T1 may be a source electrode. The output electrode of the first pixel switching element T1 may be a drain electrode.

According to some example embodiments, the first pixel switching element T1 may further include a back gate electrode BML1 receiving the first back gate signal BS1 or the second back gate signal BS2. The first pixel switching element T1 may have a back gate structure. The pixel switching element of the back gate structure may include a gate electrode and an additional gate electrode (back gate electrode).

Although the first pixel switching element T1 further includes the back gate electrode BML1 according to some example embodiments, embodiments according to the present inventive concept are not limited thereto. At least one of the first to seventh pixel switching elements T1 to T7 may include the back gate electrode.

For example, when the pixel is located in the first display area DA1, the first back gate signal BS1 may be applied to the back gate electrode BML1 of the first pixel switching element T1. When the pixel is located in the second display area DA2, the second back gate signal BS2 may be applied to the back gate electrode BML1 of the first pixel switching element T1.

The second pixel switching element T2 includes a control electrode receiving the data write gate signal GW, an input electrode receiving the data voltage VDATA and an output electrode connected to the second node N2.

For example, the second pixel switching element T2 may be the P-type thin film transistor. The control electrode of the second pixel switching element T2 may be a gate electrode. The input electrode of the second pixel switching element T2 may be a source electrode. The output electrode of the second pixel switching element T2 may be a drain electrode.

The third pixel switching element T3 includes a control electrode receiving the data write gate signal GW, an input electrode connected to the first node N1 and an output electrode connected to the third node N3.

For example, the third pixel switching element T3 may be the P-type thin film transistor. The control electrode of the third pixel switching element T3 may be a gate electrode. The input electrode of the third pixel switching element T3 may be a source electrode. The output electrode of the third pixel switching element T3 may be a drain electrode.

The fourth pixel switching element T4 includes a control electrode receiving the data initialization gate signal GI, an input electrode receiving an initialization voltage VI and an output electrode connected to the first node N1.

For example, the fourth pixel switching element T4 may be the P-type thin film transistor. The control electrode of the fourth pixel switching element T4 may be a gate electrode. The input electrode of the fourth pixel switching element T4 may be a source electrode. The output electrode of the fourth pixel switching element T4 may be a drain electrode.

The fifth pixel switching element T5 includes a control electrode receiving the emission signal EM, an input electrode receiving a high power voltage ELVDD and an output electrode connected to the second node N2.

For example, the fifth pixel switching element T5 may be the P-type thin film transistor. The control electrode of the fifth pixel switching element T5 may be a gate electrode. The input electrode of the fifth pixel switching element T5 may be a source electrode. The output electrode of the fifth pixel switching element T5 may be a drain electrode.

The sixth pixel switching element T6 includes a control electrode receiving the emission signal EM, an input electrode connected to the third node N3 and an output electrode connected to an anode electrode of the organic light emitting element OLED.

For example, the sixth pixel switching element T6 may be the P-type thin film transistor. The control electrode of the sixth pixel switching element T6 may be a gate electrode, the input electrode of the sixth pixel switching element T6 may be a source electrode and the output electrode of the sixth pixel switching element T6 may be a drain electrode.

The seventh pixel switching element T7 includes a control electrode receiving the organic light emitting element initialization gate signal GB, an input electrode receiving the initialization voltage VI and an output electrode connected to the anode electrode of the organic light emitting element OLED.

For example, the seventh pixel switching element T7 may be a P-type thin film transistor. The control electrode of the seventh pixel switching element T7 may be a gate electrode, the input electrode of the seventh pixel switching element T7 may be a source electrode and the output electrode of the seventh pixel switching element T7 may be a drain electrode.

The storage capacitor CST includes a first electrode receiving the high power voltage ELVDD and a second electrode connected to the first node N1.

The organic light emitting element OLED includes the anode electrode and a cathode electrode receiving a low power voltage ELVSS.

As shown in FIG. 5, during a first duration DU1, the first node N1 and the storage capacitor CST are initialized in response to the data initialization gate signal GI. During a second duration DU2, a threshold voltage |VTH| of the first pixel switching element T1 is compensated and the data voltage VDATA of which the threshold voltage |VTH| is compensated is written to the first node N1 in response to the data write gate signal GW. During the second duration DU2, the anode electrode of the organic light emitting element OLED is initialized in response to the organic light emitting element initialization gate signal GB. During a third duration DU3, the organic light emitting element OLED emit the light in response to the emission signal EM so that the display panel 100 displays the image.

During the first duration DU1, the data initialization gate signal GI may have an active level. For example, the active level of the data initialization gate signal GI may be a low level. When the data initialization gate signal GI has the active level, the fourth pixel switching element T4 is turned on so that the initialization voltage VI may be applied to the first node N1. The data initialization gate signal GI[N] of a present stage may be generated based on a scan signal SCAN[N−1] of a previous stage.

During the second duration DU2, the data write gate signal GW may have an active level. For example, the active level of the data write gate signal GW may be a low level. When the data write gate signal GW has the active level, the second pixel switching element T2 and the third pixel switching element T3 are turned on. In addition, the first pixel switching element T1 is turned on in response to the initialization voltage VI. The data write gate signal GW[N] of the present stage may be generated based on a scan signal SCAN[N] of the present stage.

A voltage which is subtraction an absolute value |VTH| of the threshold voltage of the first pixel switching element T1 from the data voltage VDATA may be charged at the first node N1 along a path generated by the first to third pixel switching elements T1, T2 and T3 which are turned on.

During the second duration DU2, the organic light emitting element initialization gate signal GB may have an active level. For example, the active level of the organic light emitting element initialization gate signal GB may be a low level. When the organic light emitting element initialization gate signal GB has the active level, the seventh pixel switching element T7 is turned on so that the initialization voltage VI may be applied to the anode electrode of the organic light emitting element OLED. The organic light emitting element initialization gate signal GB[N] of the present stage may be generated based on the scan signal SCAN[N] of the present stage.

Although the active timing of the organic light emitting element initialization gate signal GB is the same as the active timing of the data write gate signal GW according to some example embodiments, embodiments according to the present inventive concept are not limited thereto. Alternatively, the active timing of the organic light emitting element initialization gate signal GB may be different from the active timing of the data write gate signal GW.

During the third duration DU3, the emission signal EM may have an active level. The active level of the emission signal EM may be a low level. When the emission signal EM has the active level, the fifth pixel switching element T5 and the sixth pixel switching element T6 are turned on. In addition, the first pixel switching element T1 is turned on by the data voltage VDATA.

A driving current flows through the fifth pixel switching element T5, the first pixel switching element T1 and the sixth pixel switching element T6 to drive the organic light emitting element OLED. An intensity of the driving current may be determined by the level of the data voltage VDATA. A luminance of the organic light emitting element OLED is determined by the intensity of the driving current. The driving current ISD flowing through a path from the input electrode to the output electrode of the first pixel switching element T1 is determined as following Equation 1.

$$ISD = \frac{1}{2}\mu\, Cox\frac{W}{L}(VSG - |VTH|)^2 \qquad \text{Equation 1}$$

In Equation 1, μ is a mobility of the first pixel switching element T1. Cox is a capacitance per unit area of the first pixel switching element T1. W/L is a width to length ratio of the first pixel switching element T1. VSG is a voltage between the input electrode N2 of the first pixel switching element T1 and the control node N1 of the first pixel switching element T1. |VTH| is the threshold voltage of the first pixel switching element T1.

The voltage VG of the first node N1 after the compensation of the threshold voltage |VTH| during the second duration DU2 may be represented as following Equation 2.

$$VG = \text{VDATA} - |VTH| \qquad \text{Equation 2:}$$

When the organic light emitting element OLED emits the light during the third duration DU3, the driving voltage VOV and the driving current ISD may be represented as following Equations 3 and 4. In Equation 3, VS is a voltage of the second node N2.

$$VOV = VS - VG - |VTH| = ELVDD - (VDATA - |VTH|) - |VTH| = ELVDD - VDATA \qquad \text{Equation 3}$$

$$ISD = \frac{1}{2}\mu\, Cox\frac{W}{L}(ELVDD - VDATA)^2 \qquad \text{Equation 4}$$

The threshold voltage |VTH| is compensated during the second duration DU2, so that the driving current ISD may be determined regardless of the threshold voltage |VTH| of the first pixel switching element T1 when the organic light emitting element OLED emits the light during the third duration DU3.

Figure 6:
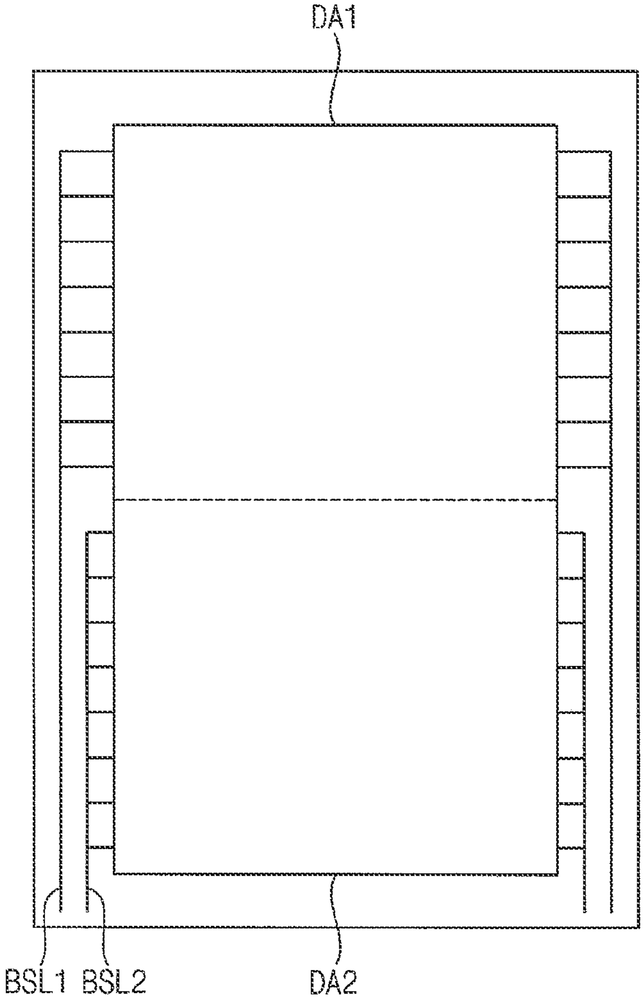
FIG. 6 is a conceptual diagram illustrating a first display area, a second display area, a first back gate signal applying line and a second back gate signal applying line of the display panel of FIG. 3.

FIG. 6 is a conceptual diagram illustrating the first display area DA1, the second display area DA2, the first back gate signal applying line BSL1 and the second back gate signal applying line BSL2 of the display panel 100 of FIG. 3.

Referring to FIGS. 1 to 6, the display panel 100 may include the first display area DA1, the second display area DA2, the first back gate signal applying line BSL1 connected to back gate electrodes (e.g., BML1 in FIG. 4) of pixels in the first display area DA1 and a second back gate signal applying line BSL2 connected to back gate electrodes (e.g., BML1 in FIG. 4) of pixels in the second display area DA2.

The back gate electrodes (e.g., BML1 in FIG. 4) of pixels in the first display area DA1 are connected with each other to form a mesh. The back gate electrodes (e.g., BML1 in FIG. 4) of pixels in the second display area DA2 are connected with each other to form a mesh. The back gate electrodes of pixels in the first display area DA1 may not be connected to the back gate electrodes of pixels in the second display area DA2.

The first back gate signal BS1 applied to the back gate electrodes of pixels in the first display area DA1 may be generated independently from the second back gate signal BS2 applied to the back gate electrodes of pixels in the second display area DA2.

Figure 7A:
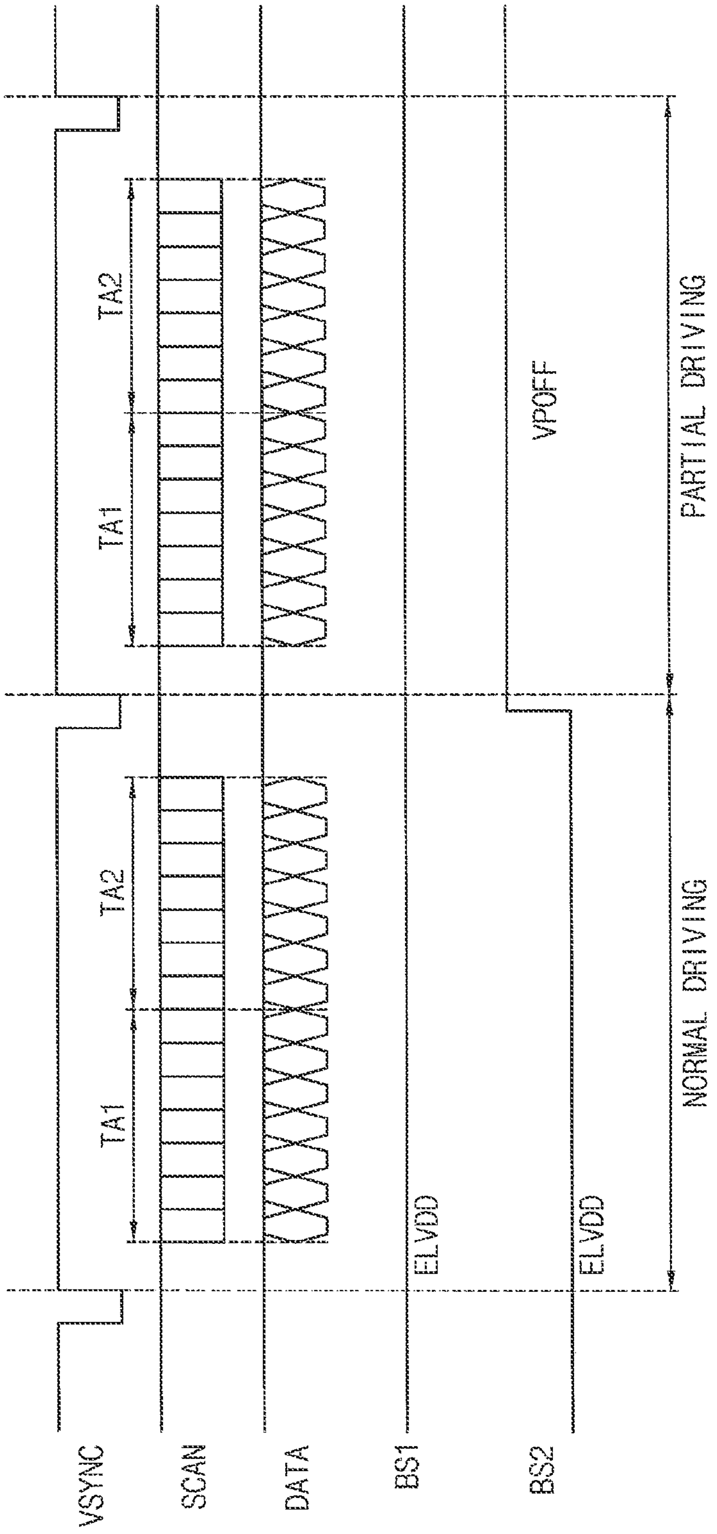
FIG. 7A is a timing diagram illustrating input signals applied to the display panel of FIG. 3.
Figure 7B:
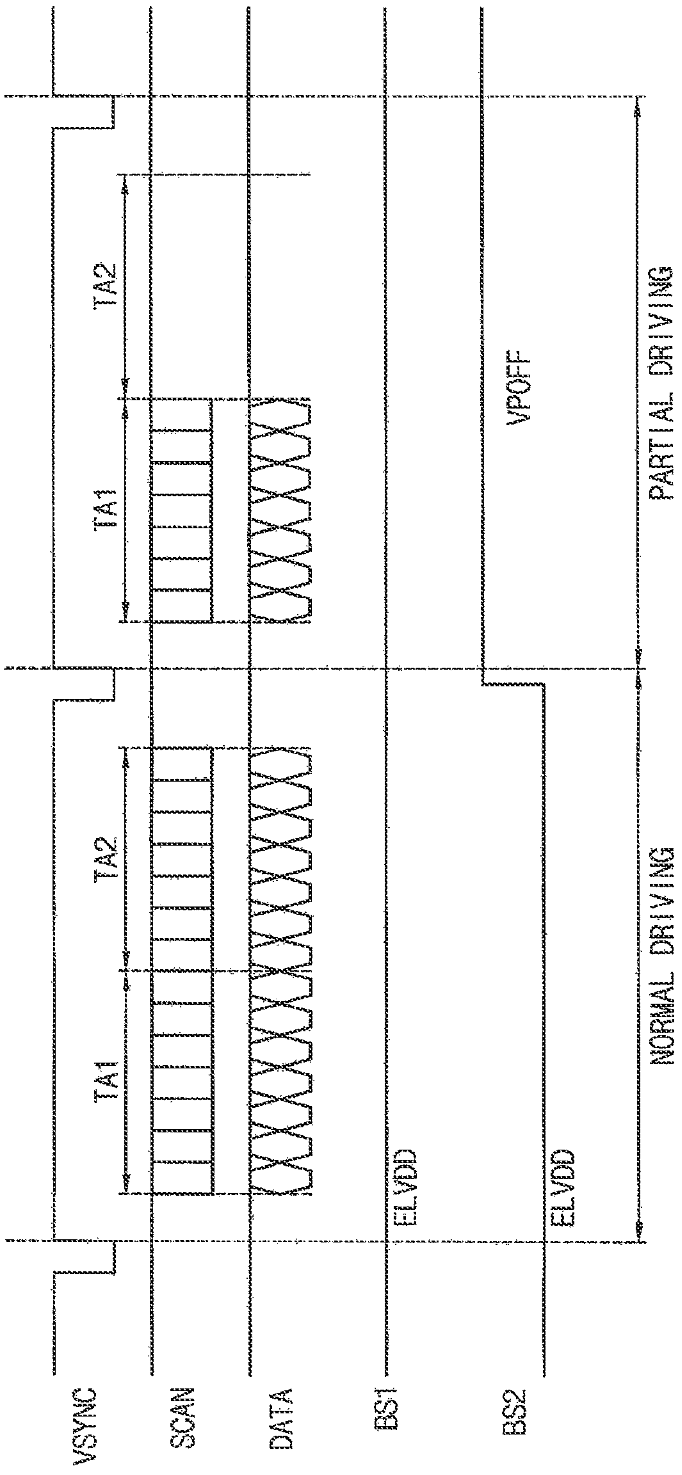
FIG. 7B is a timing diagram illustrating input signals applied to the display panel of FIG. 3.
Figure 7C:
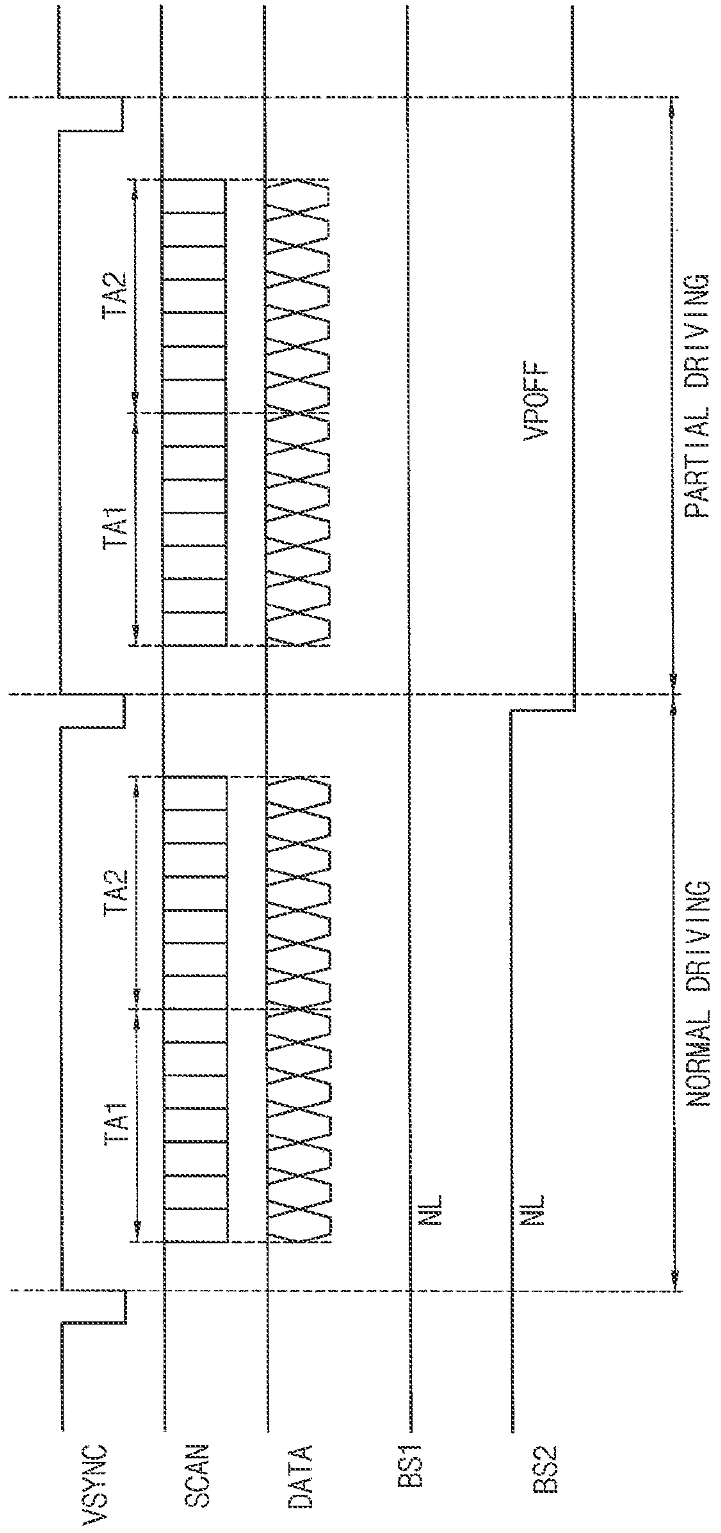
FIG. 7C is a timing diagram illustrating input signals applied to the display panel of FIG. 3.
Figure 7D:
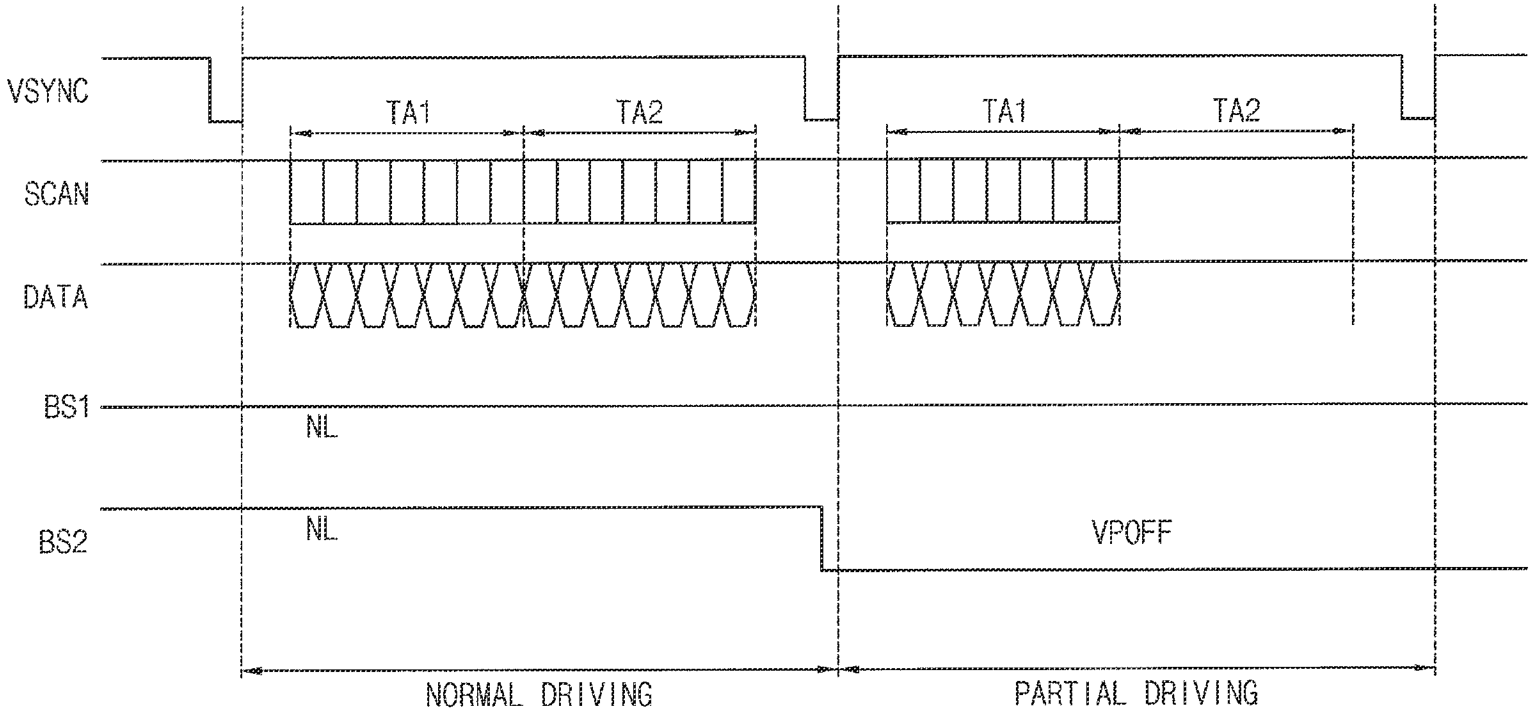
FIG. 7D is a timing diagram illustrating input signals applied to the display panel of FIG. 3.
Figure 8A:
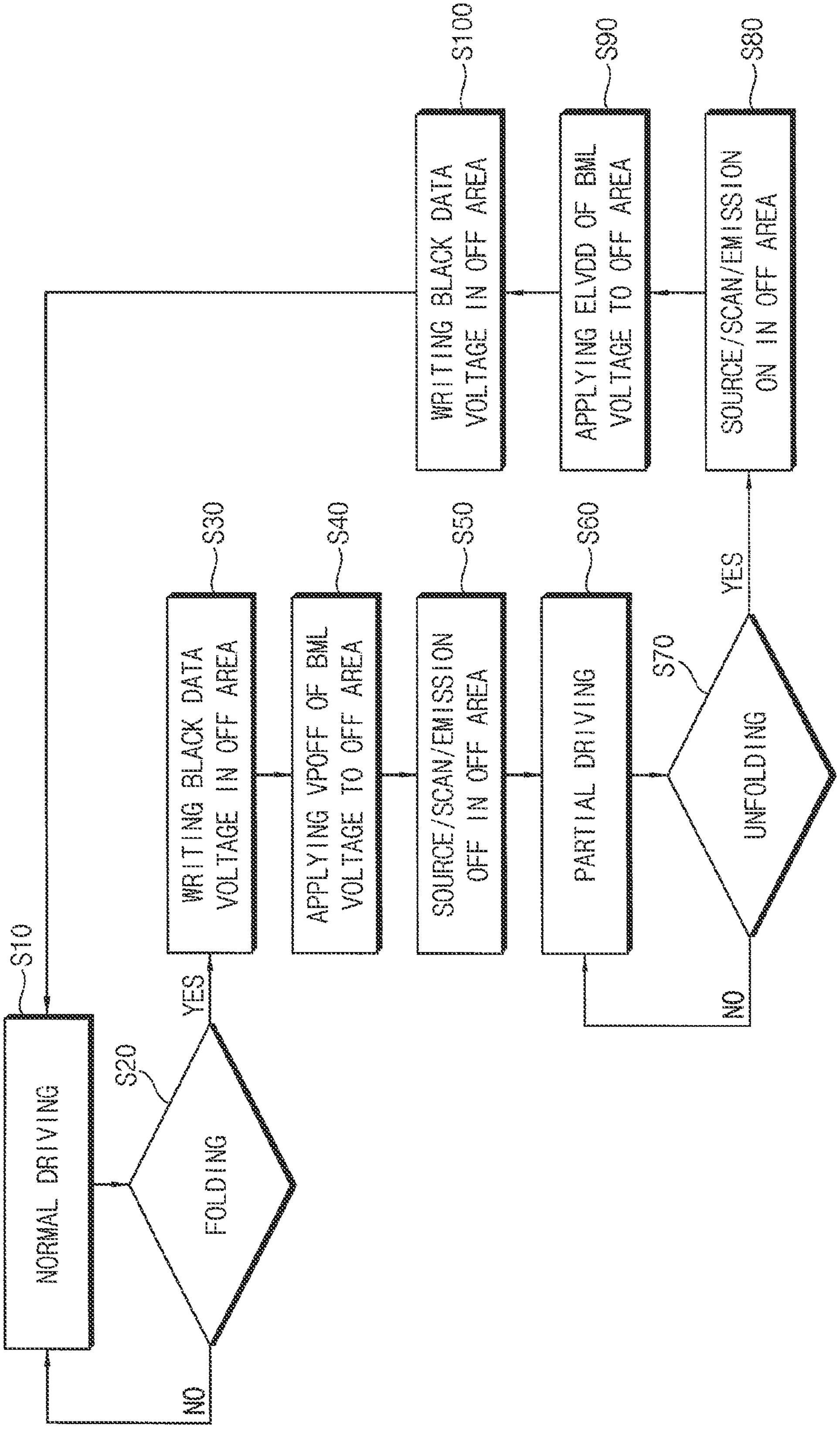
FIG. 8A is a flowchart diagram illustrating a method of driving the display apparatus of FIG. 1.
Figure 8B:
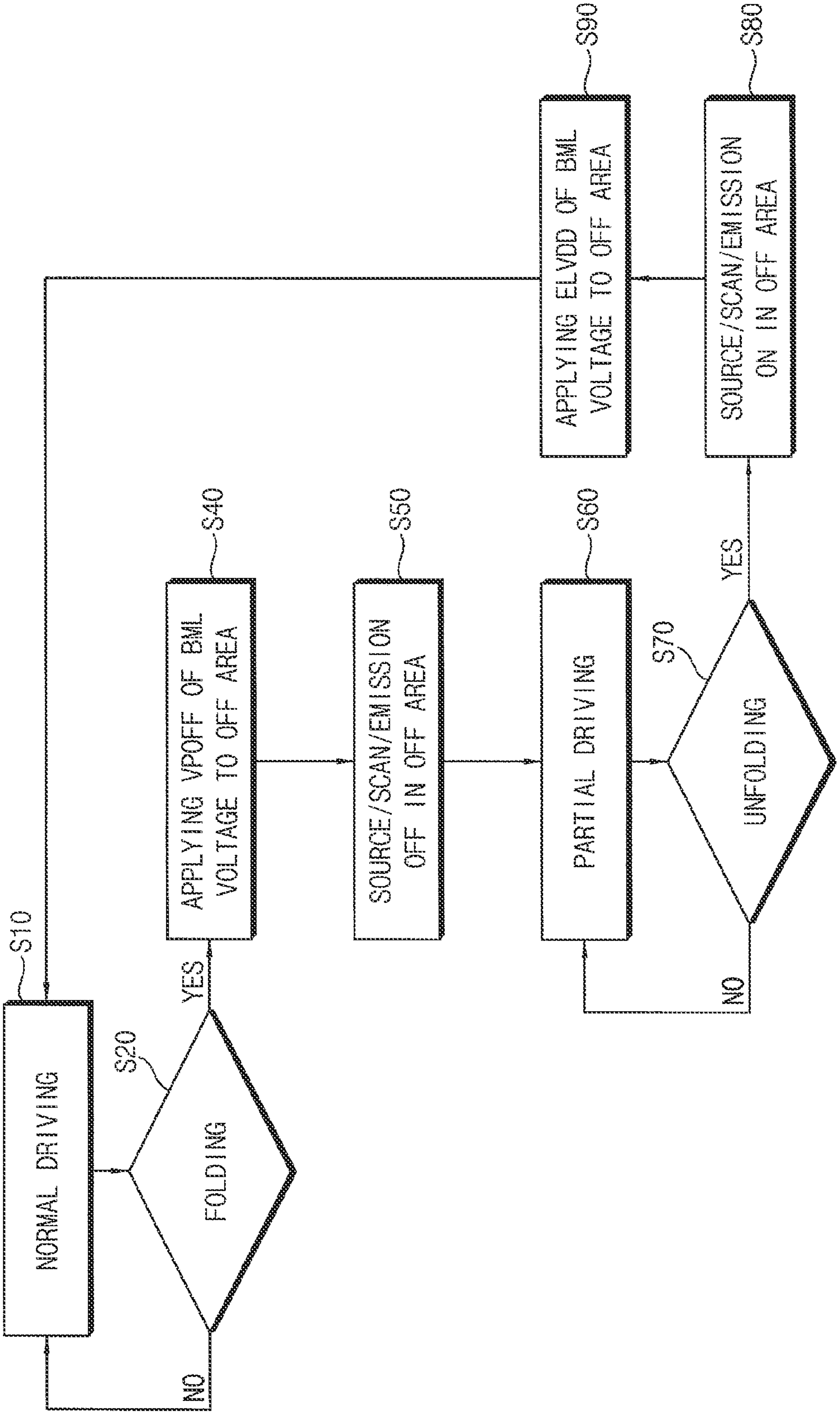
FIG. 8B is a flowchart diagram illustrating a method of driving the display apparatus of FIG. 1.

FIG. 7A is a timing diagram illustrating input signals applied to the display panel 100 of FIG. 3. FIG. 7B is a timing diagram illustrating input signals applied to the display panel 100 of FIG. 3. FIG. 7C is a timing diagram illustrating input signals applied to the display panel 100 of FIG. 3. FIG. 7D is a timing diagram illustrating input signals applied to the display panel 100 of FIG. 3. FIG. 8A is a flowchart diagram illustrating a method of driving the display apparatus of FIG. 1. FIG. 8B is a flowchart diagram illustrating a method of driving the display apparatus of FIG. 1.

Referring to FIGS. 1 to 8B, the display apparatus may be operated in a normal driving mode and a partial driving mode.

When the display panel 100 is in an unfolded status, the display apparatus may be operated in the normal driving mode. When the display panel 100 is in a folded status, the display apparatus may be operated in the partial driving mode.

In the normal driving mode, the first display area DA1 and the second display area DA2 may display an image. In the normal driving mode, the first display area DA1 and the second display area DA2 may be entirely scanned. As shown in FIGS. 7A to 7D, in the normal driving mode, the gate signal SCAN and the data voltage DATA may be normally applied to the first display area DA1 during a first period TA1 when the first display area DA1 is driven and the gate signal SCAN and the data voltage DATA may be normally applied to the second display area DA2 during a second period TA2 when the second display area DA2 is driven.

In addition, the first back gate signal BS1 may have a normal level and the second back gate signal BS2 may have a normal level in the normal driving mode. The normal level may mean a level not turning off the pixel switching element by the first and second back gate signals BS1 and BS2 so that the pixel switching element is normally operated by the normal level of the first and second back gate signals BS1 and BS2.

For example, the normal level may be the high power voltage ELVDD of the organic light emitting element OLED.

For example, the first back gate signal BS1 may be substantially the same as the second back gate signal BS2 in the normal driving mode.

In the partial driving mode, the first display area DA1 may display an image and the second display area DA2 may not display an image.

In FIG. 7A, in the partial driving mode, the gate signal SCAN and the data voltage DATA may be normally applied to the first display area DA1 and the second display area DA2 during the first period TA1 when the first display area DA1 is driven and the second period TA2 when the second display area DA2 is driven.

In addition, the first back gate signal BS1 may have the normal level (e.g., ELVDD) and the second back gate signal BS2 may have an inactive level VPOFF greater than the normal level (e.g., ELVDD) in the partial driving mode. The inactive level VPOFF may mean a level turning off the pixel switching element by the first and second back gate signals BS1 and BS2.

For example, the inactive level may be a pixel off voltage VPOFF greater than the high power voltage ELVDD of the organic light emitting element OLED in FIG. 7A.

When the pixel off voltage VPOFF is applied to the back gate electrode BML1 of the first pixel switching element T1 of FIG. 4, the first pixel switching element T1 is turned off. When the first pixel switching element T1 is turned off, a current path generated through the fifth pixel switching element T5, the first pixel switching element T1, the sixth pixel switching element T6 and the organic light emitting element OLED is cut so that the pixel does not emit the light.

For example, the first back gate signal BS1 may be different from the second back gate signal BS2 in the partial driving mode. In FIG. 7A, the second back gate signal BS2 may be greater than the first back gate signal BS1 in the partial driving mode.

The normal driving mode and the partial driving mode may be determined in a unit of a frame which is defined by the vertical synchronizing signal VSYNC.

In FIG. 7B, in the partial driving mode, the gate signal SCAN and the data voltage DATA may be normally applied to the first display area DA1 during the first period TA1 when the first display area DA1 is driven and the gate signal SCAN and the data voltage DATA may not be applied to the second display area DA2 during the second period TA2 when the second display area DA2 is driven to reduce the power consumption.

In addition, the first back gate signal BS1 may have the normal level (e.g., ELVDD) and the second back gate signal BS2 may have the inactive level VPOFF greater than the normal level (e.g., ELVDD) in the partial driving mode.

In FIGS. 7C and 7D, the switching element (e.g., the first pixel switching element T1) receiving the first back gate signal BS1 or the second back gate signal BS2 is an N-type switching element.

In FIG. 7C, in the partial driving mode, the gate signal SCAN and the data voltage DATA may be normally applied to the first display area DA1 and the second display area DA2 during the first period TA1 when the first display area DA1 is driven and the second period TA2 when the second display area DA2 is driven.

In addition, the first back gate signal BS1 may have the normal level NL and the second back gate signal BS2 may have an inactive level VPOFF less than the normal level NL in the partial driving mode. The inactive level VPOFF may mean a level turning off the pixel switching element by the first and second back gate signals BS1 and BS2.

For example, the first back gate signal BS1 may be different from the second back gate signal BS2 in the partial driving mode. In FIG. 7C, the second back gate signal BS2 may be less than the first back gate signal BS1 in the partial driving mode.

In FIG. 7D, in the partial driving mode, the gate signal SCAN and the data voltage DATA may be normally applied to the first display area DA1 during the first period TA1 when the first display area DA1 is driven and the gate signal SCAN and the data voltage DATA may not be applied to the second display area DA2 during the second period TA2 when the second display area DA2 is driven to reduce the power consumption.

In addition, the first back gate signal BS1 may have the normal level NL and the second back gate signal BS2 may have the inactive level VPOFF less than the normal level NL in the partial driving mode.

When the display panel 100 is in the unfolded status (e.g., unfolded state or condition), the display panel 100 may be driven in the normal driving mode (operation S10).

The folded status (e.g., the folded state or condition) of the display panel 100 may be determined (operation S20). When the display panel 100 is not folded, the normal driving mode may be maintained. When the display panel 100 is folded, the display panel 100 may be driven in the partial driving mode.

When the display panel 100 is folded, a black data voltage may be written in an off area (e.g., the second display area DA2) where the image should not be displayed (operation S30 in FIG. 8A). The operation S30 writing the black data voltage in the off area (e.g., the second display area DA2) is an operation to stabilize the display image so that the operation S30 may be omitted as shown in FIG. 8B.

When the display panel 100 is folded, the back gate signal (e.g., the second back gate signal BS2) corresponding to the off area may be increased from the normal level to the inactive level VPOFF greater than the normal level (operation S40).

When the display panel 100 is folded, at least one of the gate driver 300, the data driver 500, or the emission driver 600 may not output the driving signal to the off area (operation S50).

For example, when the display panel 100 is folded, a carry signal is not transmitted to a portion of the gate driver 300 corresponding to the off area so that the gate driver 300 may not output the gate signal GW, GI and GB to the off area.

For example, when the display panel 100 is folded, an output buffer of the data driver 500 is inactivated when outputting the data voltage VDATA to the off area so that the data driver 500 may not output the data voltage VDATA to the off area.

For example, when the display panel 100 is folded, a carry signal is not transmitted to a portion of the emission driver 600 corresponding to the off area so that the emission driver 600 may not output the emission signal EM to the off area.

As explained above, when the display panel 100 is folded, the display apparatus may be operated in the partial driving mode (operation S60) through the operations S30, S40 and S50.

An unfolding action of the display panel 100 may be determined in the folded status of the display panel 100 (operation S70). When the display panel 100 is not unfolded, the partial driving mode may be maintained. When the display panel 100 is unfolded, the display panel 100 may be driven in the normal driving mode.

When the display panel 100 is unfolded, the inactivated element among the gate driver 300, the data driver 500 and the emission driver 600 may be activated. Thus, when the display panel 100 is unfolded, the gate driver 300, the data driver 500 and the emission driver 600 may output the driving signal to the first display area DA1 and the second display area DA2 of the display panel 100 (operation S80).

When the display panel 100 is unfolded from the folded status, the back gate signal (e.g., the second back gate signal BS2) corresponding to the off area in the folded status may be decreased from the inactive level VPOFF to the normal level (e.g., ELVDD) (operation S90).

When the display panel 100 is unfolded, the black data voltage may be temporally written in the off area (e.g., the second display area DA2) of the folded status (operation S100) to prevent an undesired image being shown to a user right after unfolding the display panel 100. The operation S100 temporally writing the black data voltage in the off area (e.g., the second display area DA2) is an operation to stabilize the display image so that the operation S100 may be omitted as shown in FIG. 8B.

As explained above, when the display panel 100 is unfolded, the display apparatus may be operated in the normal driving mode by the operations S80, S90 and S100 (operation S10).

Figure 9:
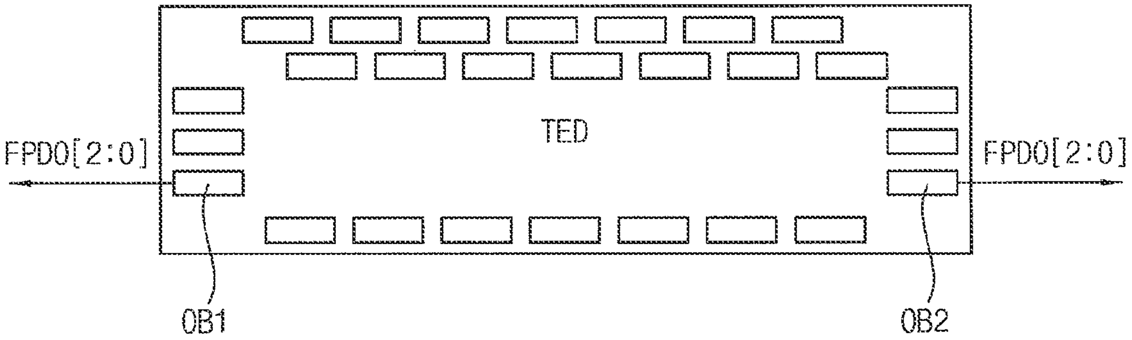
FIG. 9 is a conceptual diagram illustrating a timing controller embedded data driver of the display apparatus of FIG. 1.
Figure 10:
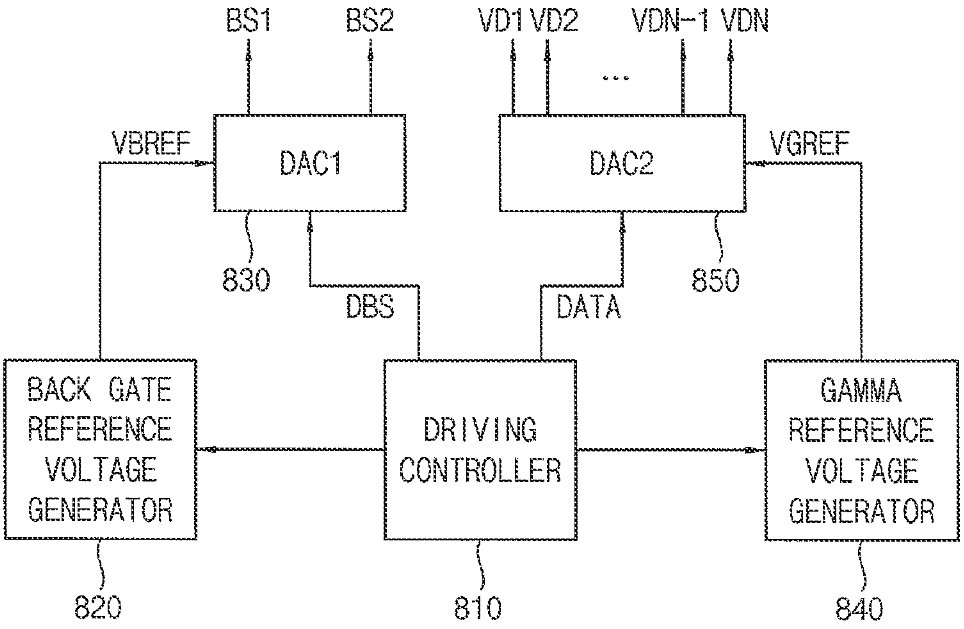
FIG. 10 is a block diagram illustrating the timing controller embedded data driver of FIG. 9.

FIG. 9 is a conceptual diagram illustrating a timing controller embedded data driver (an integrated driver) TED of the display apparatus of FIG. 1. FIG. 10 is a block diagram illustrating the timing controller embedded data driver TED of FIG. 9.

Referring to FIGS. 1 to 10, the driving controller 200, the data driver 500 and the back gate signal generator 700 may form the timing controller embedded data driver (the integrated driver) TED.

The timing controller embedded data driver TED may include the driving controller 200 and 810, a back gate reference voltage generator 820, a first digital to analog converter 830, a gamma reference voltage generator 400 and 840 and a second digital to analog converter 850.

The back gate reference voltage generator 820 may generate a back gate reference voltage VBREF. The back gate reference voltage generator 820 may correspond to a level of the first back gate signal BS1 and a level of the second back gate signal BS2. The driving controller 810 may transmit settings regarding a minimum value and a maximum value of the level of the first back gate signal BS1 and a minimum value and a maximum value of the level of the second back gate signal BS2. The back gate reference voltage generator 820 may include a resistor string including a plurality of resistors. The back gate reference voltage generator 820 may generate the back gate reference voltage VBREF based on the minimum value and the maximum value in a voltage dividing method.

The first digital to analog converter 830 may convert a back gate digital signal DBS received from the driving controller 810 into the first back gate signal BS1 having an analog type and the second back gate signal BS2 having an analog type based on the back gate reference voltage VBREF. The first digital to analog converter 830 may output the first back gate signal BS1 and the second back gate signal BS2 to the first back gate signal applying line BSL1 and the second back gate signal applying line BSL2.

The gamma reference voltage generator 840 may generate the gamma reference voltage VGREF. The gamma reference voltage VGREF may correspond to a level of the data voltage. The driving controller 810 may transmit detailed settings regarding a minimum value of the gamma reference voltage, a maximum value of the gamma reference voltage, a gamma value and a gamma curve to the gamma reference voltage generator 840. The gamma reference voltage generator 840 may include a resistor string including a plurality of resistors. The gamma reference voltage generator 840 may generate the gamma reference voltage VGREF based on the detailed settings regarding the minimum value of the gamma reference voltage, the maximum value of the gamma reference voltage, the gamma value and the gamma curve.

The second digital to analog converter 850 may convert data signal having a digital type and received from the driving controller 810 based on the gamma reference voltage VGREF to the data voltage VD1, VD2, . . . , VDN-1 and VDN having an analog type. The second digital to analog converter 850 may output the data voltages VD1, VD2, . . . , VDN-1 and VDN to the data lines.

The first back gate signal BS1 and the second back gate signal BS2 are controlled in a unit of a horizontal line of the input image data by the driving controller 810 so that the first back gate signal BS1 and the second back gate signal BS2 may be adjusted in a unit of the horizontal line of the input image data. Thus, the first back gate signal BS1 and the second back gate signal BS2 may be controlled in a short cycle.

The timing controller embedded data driver TED may include output pads OB1 and OB2 outputting the first back gate signal BS1 and the second back gate signal BS2 to the first back gate signal applying line BSL1 and the second back gate signal applying line BSL2. In FIG. 9, FPDO[2:0] may mean the plurality of the back gate signals output through the output pads OB1 and OB2.

According to some example embodiments, the independent back gate signals BS1 and BS2 are applied to the first back gate electrodes located in the first display area DA1 and the second back gate electrodes located in the second display area DA2 so that the pixels in the inactive area DA2 may be controlled not to emit the light. In addition, the gate driver 300 does not output the gate signal to the inactive area DA2, the data driver 500 does not output the data voltage to the inactive area DA2 and the emission driver 600 does not output the emission signal to the inactive area DA2 in a folded status of the display panel. Thus, the power consumption of the display apparatus may be reduced.

Figure 11:
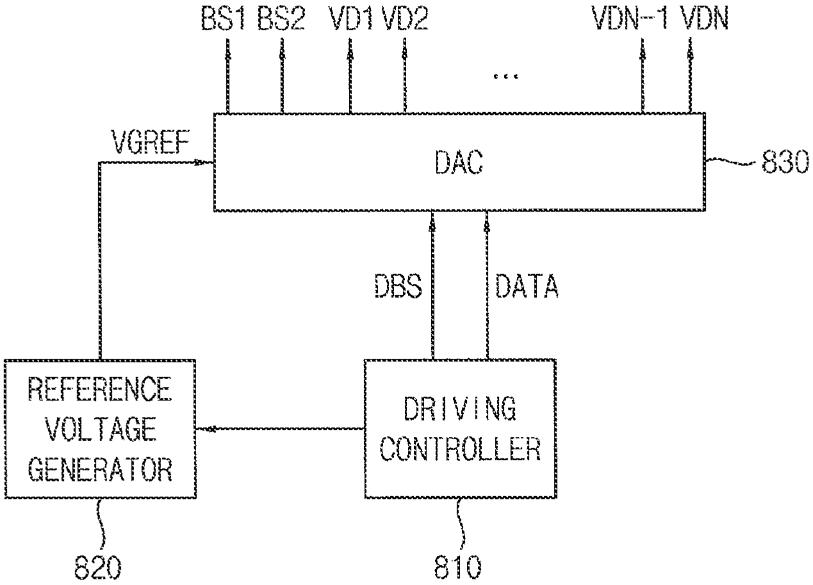
FIG. 11 is a block diagram illustrating a timing controller embedded data driver of a display apparatus according to some example embodiments of the present inventive concept.

FIG. 11 is a block diagram illustrating a timing controller embedded data driver TED of a display apparatus according to some example embodiments of the present inventive concept.

The display apparatus and the method of driving the display apparatus according to the present example embodiment is substantially the same as the display apparatus and the method of driving the display apparatus of the previous example embodiment explained referring to FIGS. 1 to 10 except for the structure of the timing controller embedded data driver. Thus, the same reference numerals will be used to refer to the same or like parts as those described in the previous example embodiment of FIGS. 1 to 10 and some repetitive explanation concerning the above elements may be omitted for brevity.

Referring to FIGS. 1 to 9 and 11, the driving controller 200, the data driver 500 and the back gate signal generator 700 may form the timing controller embedded data driver TED.

The timing controller embedded data driver TED may include the driving controller 200 and 810, a reference voltage generator 820 and a digital to analog converter 830.

The reference voltage generator 820 may generate a gamma reference voltage VGREF. The gamma reference voltage VGREF may correspond to a level of the data voltage, a level of the first back gate signal BS1 and a level of the second back gate signal BS2. The driving controller 810 may transmit detailed settings regarding a minimum value of the gamma reference voltage, a maximum value of the gamma reference voltage, a gamma value and a gamma curve to the reference voltage generator 820. The reference voltage generator 820 may include a resistor string including a plurality of resistors. The reference voltage generator 820 may generate the gamma reference voltage VGREF based on the detailed settings regarding the minimum value of the gamma reference voltage, the maximum value of the gamma reference voltage, the gamma value and the gamma curve.

The digital to analog converter 830 may convert a back gate digital signal DBS received from the driving controller 810 into the first back gate signal BS1 having an analog type and the second back gate signal BS2 having an analog type based on the gamma reference voltage VGREF. The digital to analog converter 830 may output the first back gate signal BS1 and the second back gate signal BS2 to the first back gate signal applying line BSL1 and the second back gate signal applying line BSL2. The digital to analog converter 830 may convert data signal having a digital type and received from the driving controller 810 based on the gamma reference voltage VGREF to the data voltage VD1, VD2, . . . , VDN-1 and VDN having an analog type. The digital to analog converter 830 may output the data voltages VD1, VD2, . . . , VDN-1 and VDN to the data lines.

According to some example embodiments, the gamma reference voltage VGREF for generating the data voltages VD1, VD2, . . . , VDN-1 and VDN is used to generate the first and second back gate signals BS1 and BS2.

The first and second back gate signals BS1 and BS2 and the data voltages VD1, VD2, . . . , VDN-1 and VDN may be generated by a single digital to analog converter 830.

The first back gate signal BS1 and the second back gate signal BS2 are controlled in a unit of a horizontal line of the input image data by the driving controller 810 so that the first back gate signal BS1 and the second back gate signal BS2 may be adjusted in a unit of the horizontal line of the input image data. Thus, the first back gate signal BS1 and the second back gate signal BS2 may be controlled in a short cycle.

According to some example embodiments, the independent back gate signals BS1 and BS2 are applied to the first back gate electrodes located in the first display area DA1 and the second back gate electrodes located in the second display area DA2 so that the pixels in the inactive area DA2 may be controlled not to emit the light. In addition, the gate driver 300 does not output the gate signal to the inactive area DA2, the data driver 500 does not output the data voltage to the inactive area DA2 and the emission driver 600 does not output the emission signal to the inactive area DA2 in a folded status of the display panel. Thus, the power consumption of the display apparatus may be reduced.

Figure 12:
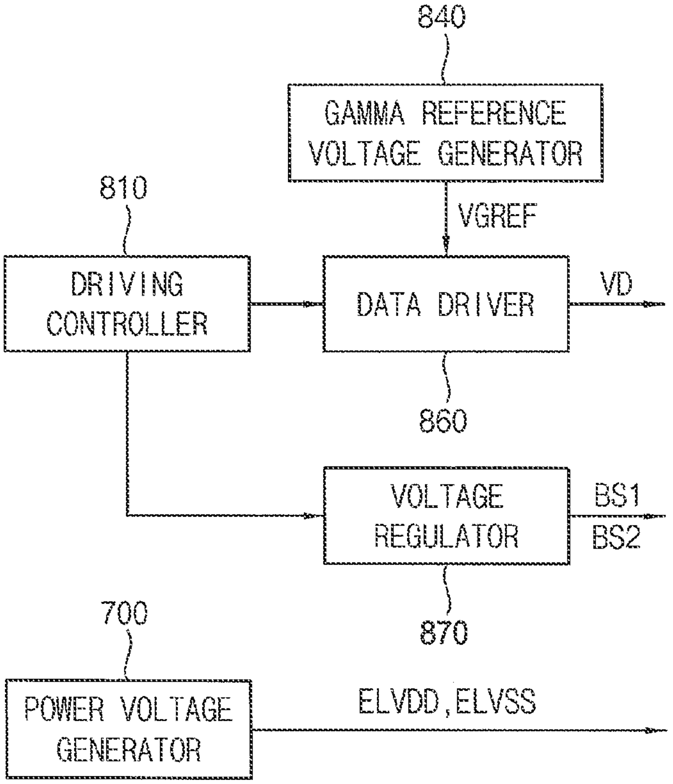
FIG. 12 is a block diagram illustrating a timing controller embedded data driver of a display apparatus according to some example embodiments of the present inventive concept.

FIG. 12 is a block diagram illustrating a timing controller embedded data driver TED of a display apparatus according to some example embodiments of the present inventive concept.

The display apparatus and the method of driving the display apparatus according to the present example embodiment is substantially the same as the display apparatus and the method of driving the display apparatus of the previous example embodiment explained referring to FIGS. 1 to 10 except for the structure of the timing controller embedded data driver. Thus, the same reference numerals will be used to refer to the same or like parts as those described in the previous example embodiment of FIGS. 1 to 10 and some repetitive explanation concerning the above elements may be omitted.

Referring to FIGS. 1 to 9 and 12, the driving controller 200, the gamma reference voltage generator 400 and the data driver 500 may form the timing controller embedded data driver TED.

The timing controller embedded data driver TED may include the driving controller 200 and 810, the gamma reference voltage generator 400 and 840, the data driver 500 and 860 and a voltage regulator 870.

The gamma reference voltage generator 840 generates a gamma reference voltage VGREF and outputs the gamma reference voltage VGREF to the data driver 860.

The data driver 860 converts the data signal to the data voltage VD based on the gamma reference voltage VGREF and outputs the data voltage VD to the display panel 100.

The voltage regulator 870 may receive information regarding a level of the first back gate signal BS1 and a level of the second back gate signal BS2 from the driving controller 810 and generate the first back gate signal BS1 and the second back gate signal BS2.

According to some example embodiments, the power voltage generator 700 may be formed independently from the timing controller embedded data driver TED. The power voltage generator 700 may be formed independently from the voltage regulator 870.

The power voltage generator 700 may generate the high power voltage ELVDD and the low power voltage ELVSS applied to the pixel of the display panel 100.

According to some example embodiments, the first back gate signal BS1 and the second back gate signal BS2 may be controlled in a unit of a frame of the input image data.

According to some example embodiments, the independent back gate signals BS1 and BS2 are applied to the first back gate electrodes located in the first display area DA1 and the second back gate electrodes located in the second display area DA2 so that the pixels in the inactive area DA2 may be controlled not to emit the light. In addition, the gate driver 300 does not output the gate signal to the inactive area DA2, the data driver 500 does not output the data voltage to the inactive area DA2 and the emission driver 600 does not output the emission signal to the inactive area DA2 in a folded status of the display panel. Thus, the power consumption of the display apparatus may be reduced.

Figure 13:
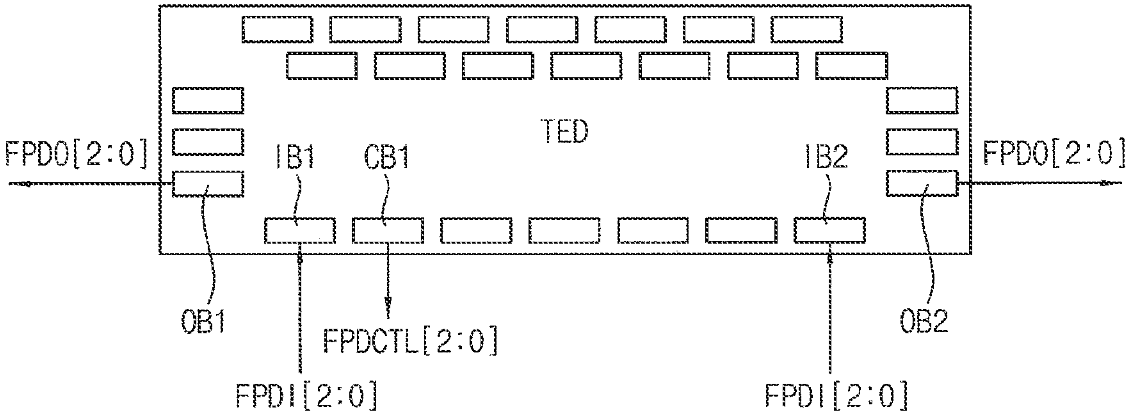
FIG. 13 is a conceptual diagram illustrating a timing controller embedded data driver of a display apparatus according to some example embodiments of the present inventive concept.
Figure 14:
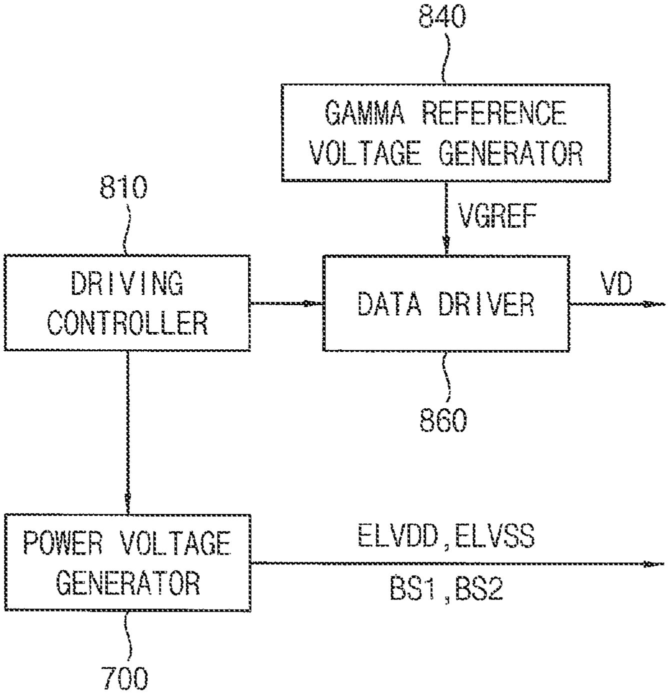
FIG. 14 is a block diagram illustrating the timing controller embedded data driver of FIG. 13.

FIG. 13 is a conceptual diagram illustrating a timing controller embedded data driver TED of a display apparatus according to some example embodiments of the present inventive concept. FIG. 14 is a block diagram illustrating the timing controller embedded data driver TED of FIG. 13.

The display apparatus and the method of driving the display apparatus according to the present example embodiment is substantially the same as the display apparatus and the method of driving the display apparatus of the previous example embodiment explained referring to FIGS. 1 to 10 except for the structure of the timing controller embedded data driver. Thus, the same reference numerals will be used to refer to the same or like parts as those described in the previous example embodiment of FIGS. 1 to 10 and some repetitive explanation concerning the above elements may be omitted.

Referring to FIGS. 1 to 8, 13 and 14, the timing controller embedded data driver TED may include the driving controller 200 and 810, the gamma reference voltage generator 400 and 840 and the data driver 500 and 860.

The gamma reference voltage generator 840 generates a gamma reference voltage VGREF and outputs the gamma reference voltage VGREF to the data driver 860.

The data driver 860 converts the data signal to the data voltage VD based on the gamma reference voltage VGREF and outputs the data voltage VD to the display panel 100.

The power voltage generator 700 may receive information regarding a level of the first back gate signal BS1 and a level of the second back gate signal BS2 from the driving controller 810 and generate the first back gate signal BS1 and the second back gate signal BS2. In addition, the power voltage generator 700 may generate the high power voltage ELVDD and the low power voltage ELVSS applied to the pixel of the display panel 100.

The power voltage generator 700 may be formed independently from the timing controller embedded data driver TED.

According to some example embodiments, the first back gate signal BS1 and the second back gate signal BS2 may be controlled in a unit of a frame of the input image data.

The timing controller embedded data driver TED may include a control pad CB1 outputting information regarding the level of the first back gate signal BS1 and the level of the second back gate signal BS2 to the power voltage generator 700, input pads IB1 and IB2 receiving the first back gate signal BS1 and the second back gate signal BS2 from the power voltage generator 700 and output pads OB1 and OB2 outputting the first back gate signal BS1 to the first back gate signal applying line BSL1 and the second back gate signal BS2 to the second back gate signal applying line BSL2. In FIG. 13, FPDO[2:0] may mean the plurality of the back gate signals output through the output pads OB1 and OB2. In FIG. 13, FPDI[2:0] may mean the plurality of the back gate signals input from the power voltage generator 700 through the input pads IB1 and IB2. In FIG. 13, FPDCTL[2:0] may mean a plurality of back gate control signals output from the timing controller embedded data driver TED to the power voltage generator 700 through the control pad CB1.

According to some example embodiments, the independent back gate signals BS1 and BS2 are applied to the first back gate electrodes located in the first display area DA1 and the second back gate electrodes located in the second display area DA2 so that the pixels in the inactive area DA2 may be controlled not to emit the light. In addition, the gate driver 300 does not output the gate signal to the inactive area DA2, the data driver 500 does not output the data voltage to the inactive area DA2 and the emission driver 600 does not output the emission signal to the inactive area DA2 in a folded status of the display panel. Thus, the power consumption of the display apparatus may be reduced.

Figure 15:
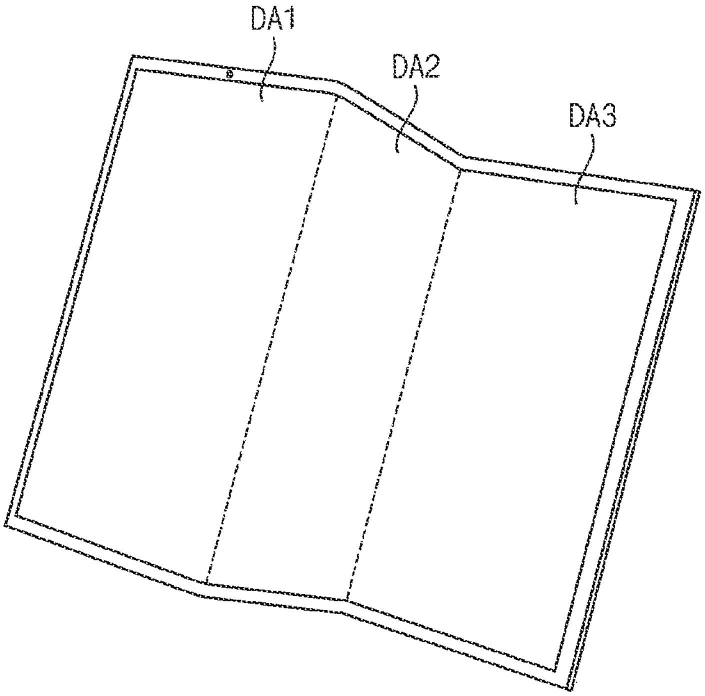
FIG. 15 is a perspective view illustrating a display apparatus according to some example embodiments of the present inventive concept.
Figure 16:
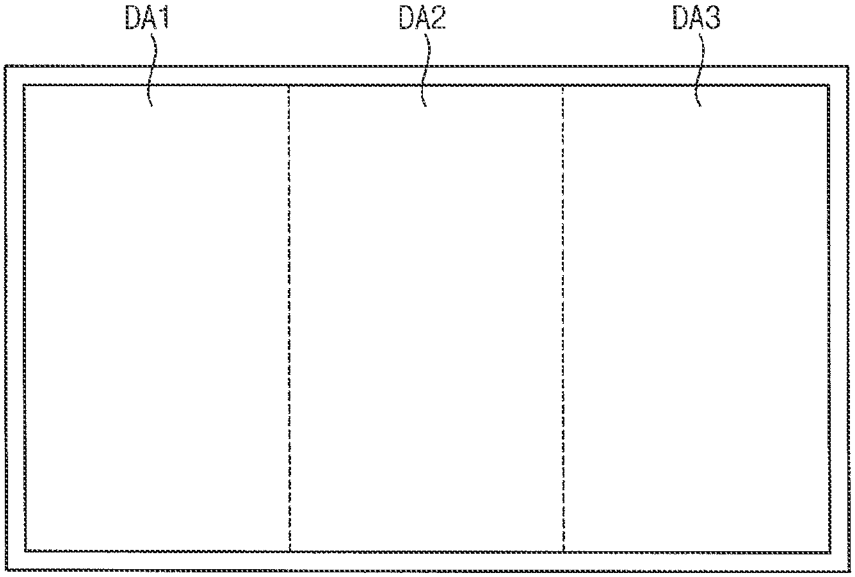
FIG. 16 is a plan view illustrating the display apparatus of FIG. 15.
Figure 17:
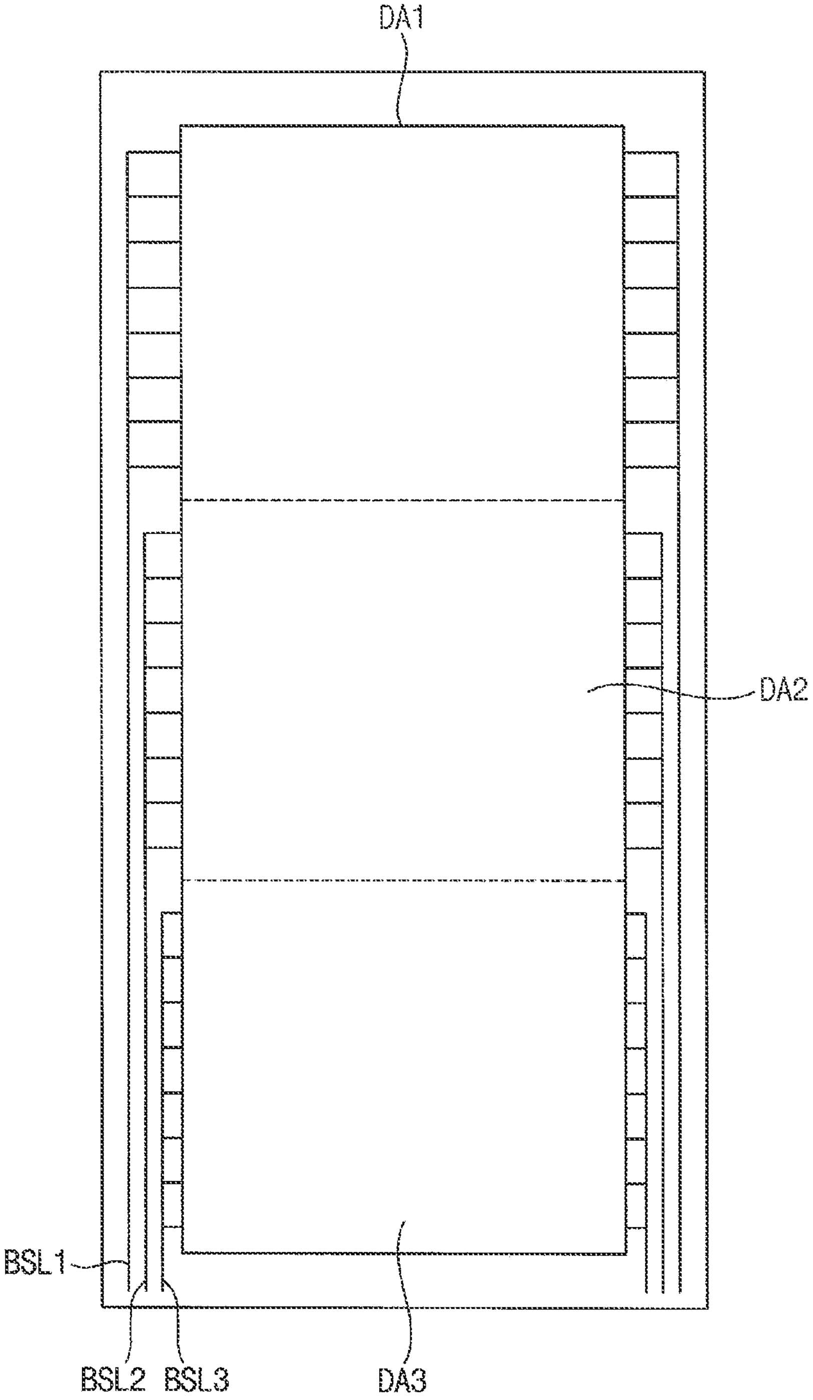
FIG. 17 is a conceptual diagram illustrating a first display area, a second display area, a third display area, a first back gate signal applying line, a second back gate signal applying line and a third back gate signal applying line of the display panel of FIG. 15.

FIG. 15 is a perspective view illustrating a display apparatus according to some example embodiments of the present inventive concept. FIG. 16 is a plan view illustrating the display apparatus of FIG. 15. FIG. 17 is a conceptual diagram illustrating a first display area DA1, a second display area DA2, a third display area DA3, a first back gate signal BSL1 applying line, a second back gate signal applying line BSL2 and a third back gate signal applying line BSL3 of the display panel of FIG. 15.

The display apparatus and the method of driving the display apparatus according to the present example embodiment is substantially the same as the display apparatus and the method of driving the display apparatus of the previous example embodiment explained referring to FIGS. 1 to 10 except that the display panel includes three display areas. Thus, the same reference numerals will be used to refer to the same or like parts as those described in the previous example embodiment of FIGS. 1 to 10 and some repetitive explanation concerning the above elements may be omitted.

Referring to FIGS. 3 to 5, 7*a* to 10 and 15 to 17, the display apparatus may include a flexible display panel. The display apparatus may be a foldable display apparatus. The display apparatus may be folded along a first folding line and a second folding line.

The display apparatus may include a first display area DA1 located at a first side of the first folding line FL, a second display area DA2 located at a second side of the first folding line and in a first side of the second folding line, and a third display area DA3 located at a second side of the second folding line.

When the display apparatus is folded as shown in FIG. 15, the first display area DA1 may display an image and the second display area DA2 and the third display area DA3 may not display an image. Alternatively, when the display apparatus is folded, the third display area DA3 may display an image and the first display area DA1 and the second display area DA2 may not display an image according to a user setting.

The display panel 100 may include a first back gate signal applying line BSL1 connected to back gate electrodes (e.g., BML1 in FIG. 4) of pixels in the first display area DA1, a second back gate signal applying line BSL2 connected to back gate electrodes (e.g., BML1 in FIG. 4) of pixels in the second display area DA2 and a third back gate signal applying line BSL3 connected to back gate electrodes (e.g., BML1 in FIG. 4) of pixels in the third display area DA3.

The back gate electrodes (e.g., BML1 in FIG. 4) of pixels in the first display area DA1 are connected with each other to form a mesh. The back gate electrodes (e.g., BML1 in FIG. 4) of pixels in the second display area DA2 are connected with each other to form a mesh. The back gate electrodes (e.g., BML1 in FIG. 4) of pixels in the third display area DA3 are connected with each other to form a mesh. The back gate electrodes of pixels in the first display area DA1, the back gate electrodes of pixels in the second display area DA2 and the back gate electrodes of pixels in the third display area DA3 may not be connected to each other.

The first back gate signal BS1 applied to the back gate electrodes of pixels in the first display area DA1, the second back gate signal BS2 applied to the back gate electrodes of pixels in the second display area DA2 and the third back gate signal BS3 applied to the back gate electrodes of pixels in the third display area DA3 may be generated independently from one another.

According to some example embodiments, the independent back gate signals BS1, BS2 and BS3 are applied to the first back gate electrodes located in the first display area DA1, the second back gate electrodes located in the second display area DA2 and the third back gate electrodes located in the third display area DA3 so that the pixels in the inactive area DA2 and DA3 may be controlled not to emit the light. In addition, the gate driver 300 does not output the gate signal to the inactive area DA2 and DA3, the data driver 500 does not output the data voltage to the inactive area DA2 and DA3 and the emission driver 600 does not output the emission signal to the inactive area DA2 and DA3 in a folded status of the display panel. Thus, the power consumption of the display apparatus may be reduced.

Figure 18:
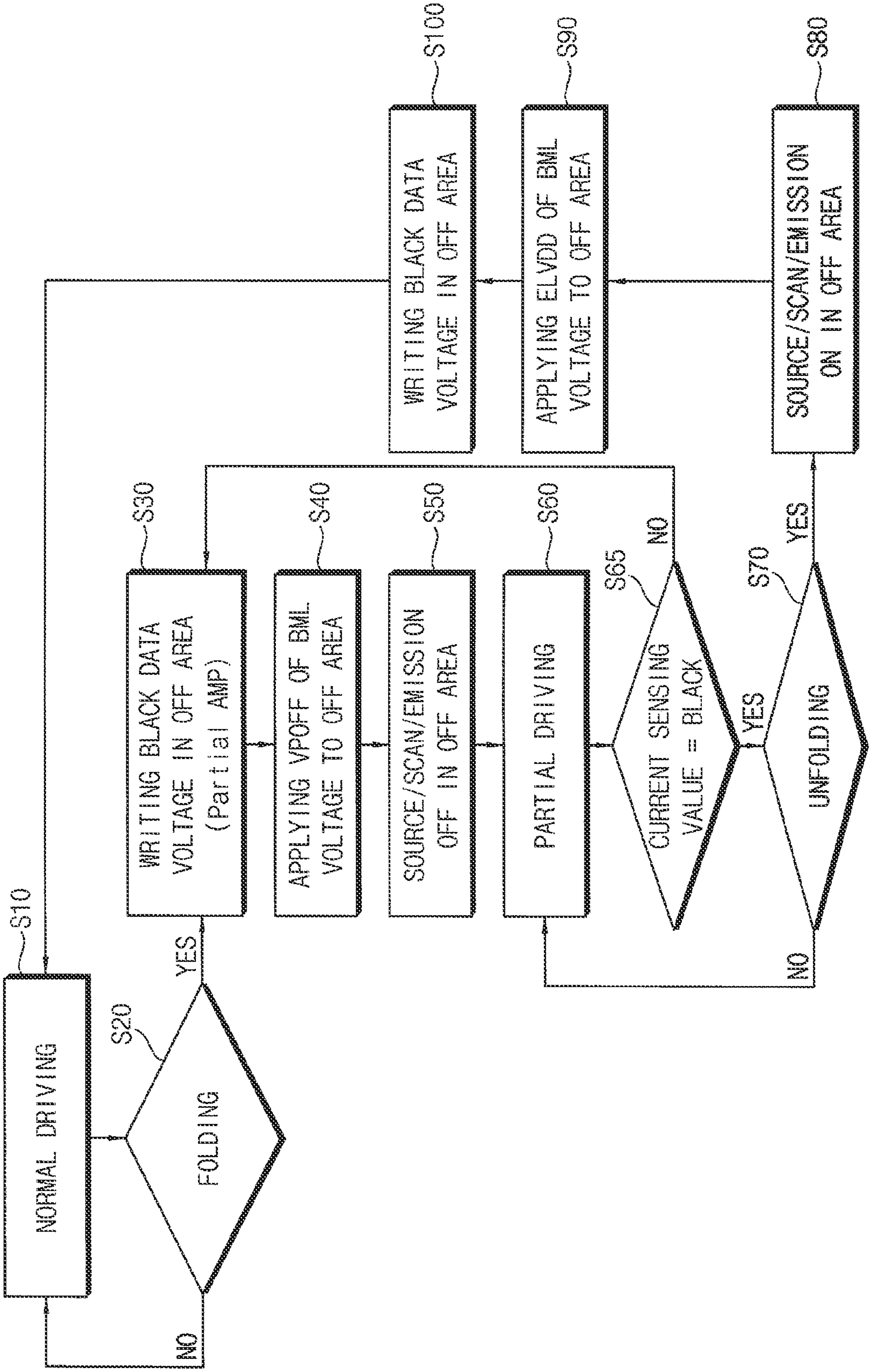
FIG. 18 is a flowchart diagram illustrating a method of driving a display apparatus according to some example embodiments of the present inventive concept.
Figure 19:
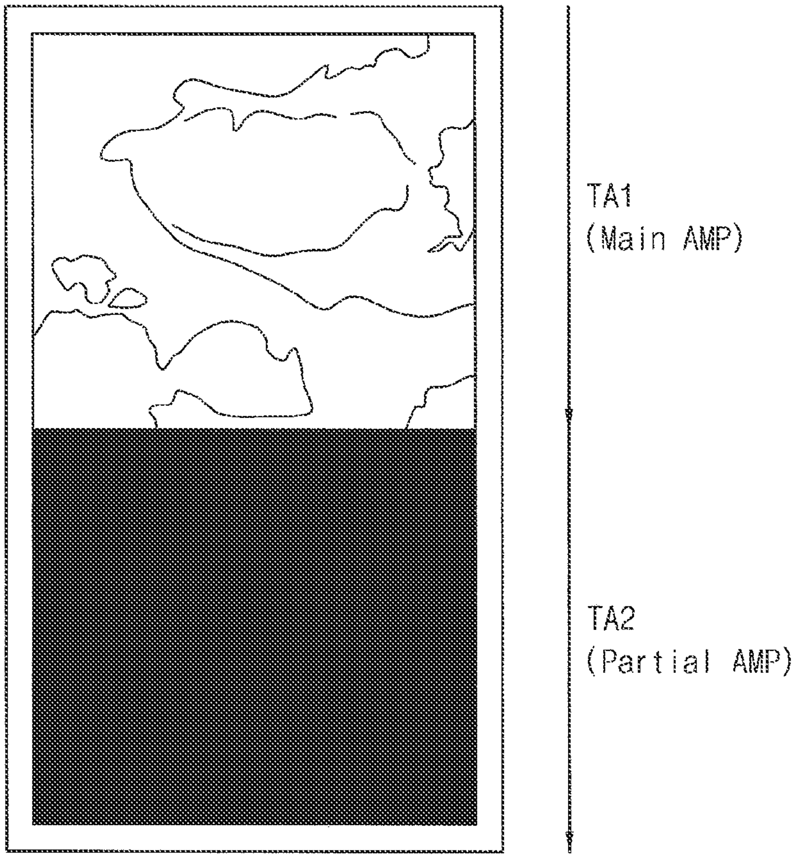
FIG. 19 is a conceptual diagram illustrating a method of partial driving of a display panel of the display apparatus of FIG. 18.
Figure 20:
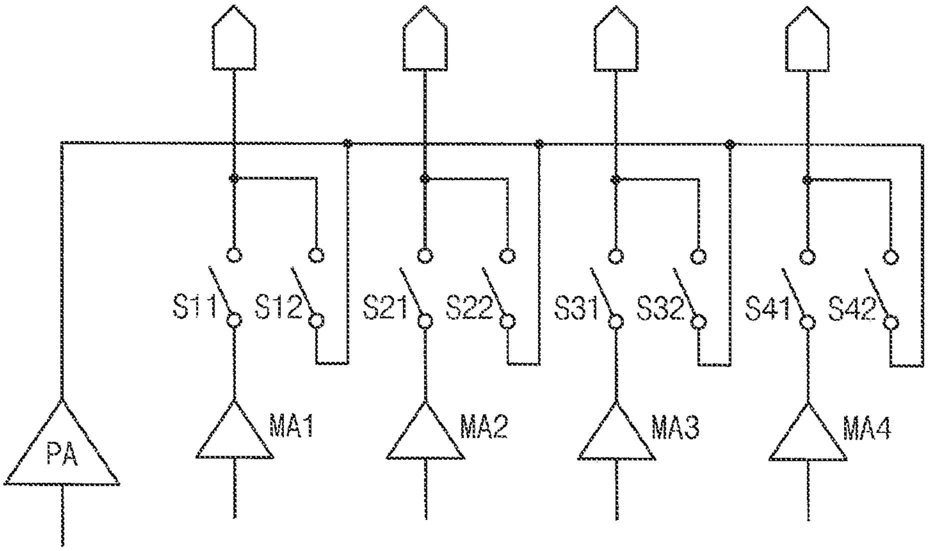
FIG. 20 is a circuit diagram illustrating a data driver of the display apparatus of FIG. 18.

FIG. 18 is a flowchart diagram illustrating a method of driving a display apparatus according to some example embodiments of the present inventive concept. FIG. 19 is a conceptual diagram illustrating a method of partial driving of a display panel of the display apparatus of FIG. 18. FIG. 20 is a circuit diagram illustrating a data driver of the display apparatus of FIG. 18.

The display apparatus and the method of driving the display apparatus according to the present example embodiment is substantially the same as the display apparatus and the method of driving the display apparatus of the previous example embodiment explained referring to FIGS. 1 to 10 except that the method of driving the display apparatus further includes sensing a current of the pixel and re-outputting the black data. Thus, the same reference numerals will be used to refer to the same or like parts as those described in the previous example embodiment of FIGS. 1 to 10 and some repetitive explanation concerning the above elements may be omitted.

Referring to FIGS. 1 to 7D and 18 to 20, when the display panel 100 is in the unfolded status, the display panel 100 may be driven in the normal driving mode (operation S10).

The folded status of the display panel 100 may be determined (operation S20). When the display panel 100 is not folded, the normal driving mode may be maintained. When the display panel 100 is folded, the display panel 100 may be driven in the partial driving mode.

When the display panel 100 is folded, a black data voltage may be written in an off area (e.g., the second display area DA2) where the image should not be displayed (operation S30 in FIG. 18). The operation S30 writing the black data voltage in the off area (e.g., the second display area DA2) is an operation to stabilize the display image.

For example, when the display panel 100 is folded, the data driver 500 may once output (e.g., output a single time) the black data to the off area (e.g., the second display area DA2) where the image should not be displayed.

When the display panel 100 is folded and after the black data is once output to the off area, the back gate signal (e.g., the second back gate signal BS2) corresponding to the off area may be increased from the normal level to the inactive level VPOFF greater than the normal level (operation S40).

When the display panel 100 is folded, at least one of the gate driver 300, the data driver 500, or the emission driver 600 may not output the driving signal to the off area (operation S50).

For example, when the display panel 100 is folded, a carry signal is not transmitted to a portion of the gate driver 300 corresponding to the off area so that the gate driver 300 may not output the gate signal GW, GI and GB to the off area.

For example, when the display panel 100 is folded, an output buffer of the data driver 500 is inactivated when outputting the data voltage VDATA to the off area so that the data driver 500 may not output the data voltage VDATA to the off area.

For example, when the display panel 100 is folded, a carry signal is not transmitted to a portion of the emission driver 600 corresponding to the off area so that the emission driver 600 may not output the emission signal EM to the off area.

As explained above, when the display panel 100 is folded, the display apparatus may be operated in the partial driving mode (operation S60) through the operations S30, S40 and S50.

When the display apparatus is operated in the partial driving mode, the current of the pixel of the display panel 100 is sensed and it is determined whether the sensed current maintains the black data or not (operation S65).

When the sensed current does not maintain the black data, the data driver 500 may output the black data to the data line again (operation S30).

When the part of the display panel driver is turned off after the black data is written to the inactive area of the display panel 100, the luminance of the inactive area of the display panel 100 may increase due to the current leakage of the pixel so that the inactive area may not display the black image, the display defect may be shown to a user and the power consumption may increase.

Thus, when the sensed current does not maintain the black data, the data driver 500 may output the black data to the data line again so that the display defect may be prevented and the power consumption may be reduced.

According to some example embodiments, the data driver 500 may include a plurality of main buffers MA1, MA2, MA3, MA4, . . . which are respectively connected to the data lines and a supplementary buffer PA commonly connected to the data lines. The data driver 500 may further include a plurality of switches S11, S12, S21, S22, S31, S32, S41 and S42. The switch S11, S12, S21, S22, S31, S32, S41 and S42 may selectively connect one of the main buffer MA1, MA2, MA3, MA4, . . . and the supplementary buffer PA to the data line.

When the data driver 500 outputs the black data again to the data line, the data driver 500 may use the supplementary buffer PA. The data driver 500 may use the main buffers MA1, MA2, MA3, MA4, . . . except that the data driver 500 outputs the black data again to the data line.

In FIG. 19, when the display panel 100 is folded, the data voltage may be output to an active area using the main buffer MA1, MA2, MA3, MA4, . . . . When the display panel 100 is folded and the black data is output again to the inactive area, the black data may be output to the inactive area using the supplementary buffer PA.

According to some example embodiments, the independent back gate signals BS1 and BS2 are applied to the first back gate electrodes located in the first display area DA1 and the second back gate electrodes located in the second display area DA2 so that the pixels in the inactive area DA2 may be controlled not to emit the light. In addition, the gate driver 300 does not output the gate signal to the inactive area DA2, the data driver 500 does not output the data voltage to the inactive area DA2 and the emission driver 600 does not output the emission signal to the inactive area DA2 in a folded status of the display panel. Thus, the power consumption of the display apparatus may be reduced.

In addition, in the folded status of the display panel 100, the current of the pixel is sensed. When the luminance of the pixel increases due to the leakage of the current of the pixel, the black data may be output again to the inactive area.

In addition, the supplementary buffer PA commonly connected to the data lines is used to output the black data to the inactive area so that the power consumption of the display apparatus may be further reduced.

Figure 21:
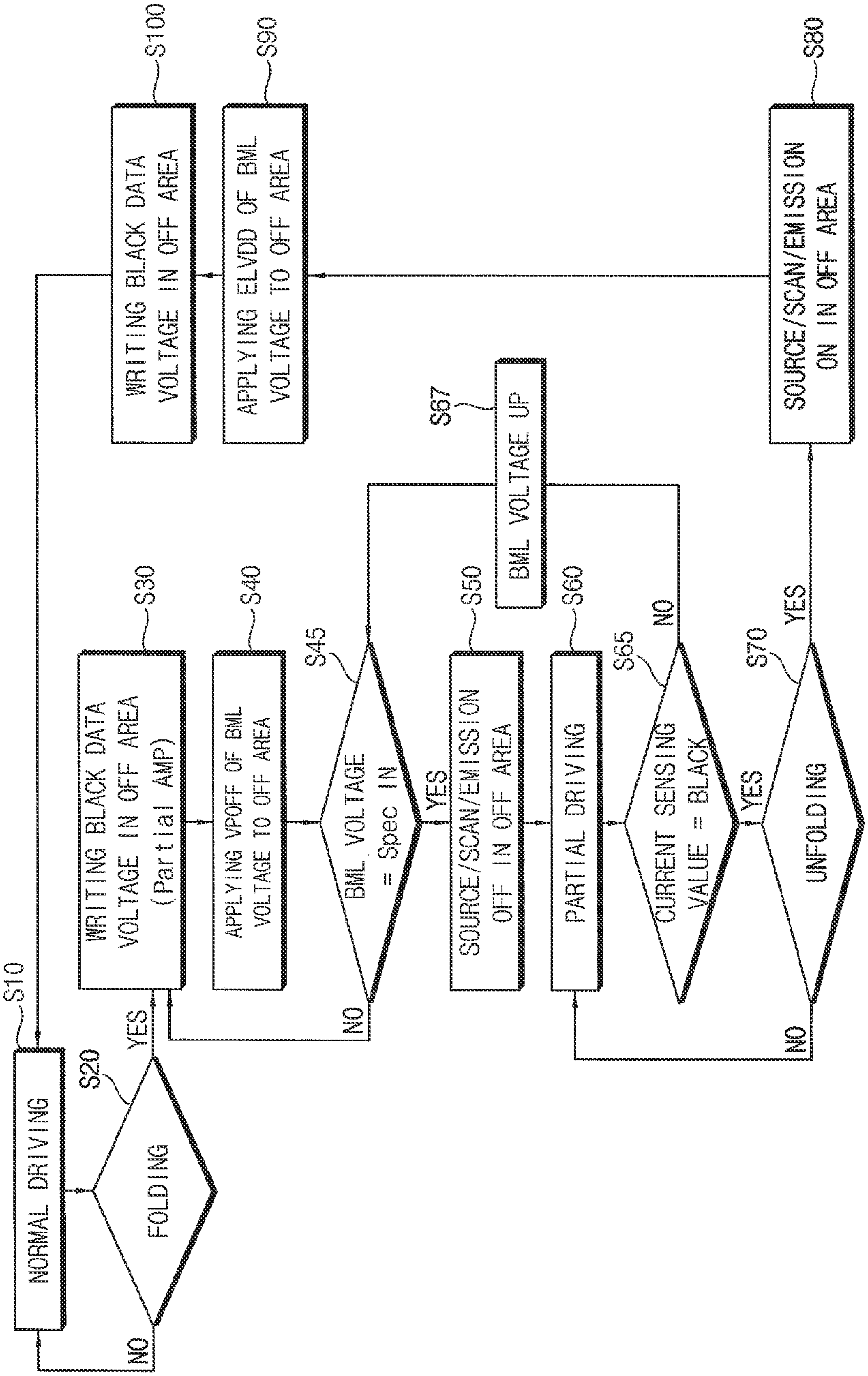
FIG. 21 is a flowchart diagram illustrating a method of driving a display apparatus according to some example embodiments of the present inventive concept.

FIG. 21 is a flowchart diagram illustrating a method of driving a display apparatus according to some example embodiments of the present inventive concept.

The display apparatus and the method of driving the display apparatus according to the present example embodiment is substantially the same as the display apparatus and the method of driving the display apparatus of the previous example embodiment explained referring to FIGS. 18 to 20 except that the method of driving the display apparatus further includes increasing the second back gate signal by sensing the current of the pixel and determining whether the increased second back gate signal exceeds a maximum back gate voltage. Thus, the same reference numerals will be used to refer to the same or like parts as those described in the previous example embodiment of FIGS. 18 to 20 and some repetitive explanation concerning the above elements may be omitted.

Referring to FIGS. 1 to 7D and 19 to 21, when the display panel 100 is in the unfolded status, the display panel 100 may be driven in the normal driving mode (operation S10).

The folded status of the display panel 100 may be determined (operation S20). When the display panel 100 is not folded, the normal driving mode may be maintained. When the display panel 100 is folded, the display panel 100 may be driven in the partial driving mode.

When the display panel 100 is folded, a black data voltage may be written in an off area (e.g., the second display area DA2) where the image should not be displayed (operation S30 in FIG. 21). The operation S30 writing the black data voltage in the off area (e.g., the second display area DA2) is an operation to stabilize the display image.

For example, when the display panel 100 is folded, the data driver 500 may once output the black data to the off area (e.g., the second display area DA2) where the image should not be displayed.

When the display panel 100 is folded and after the black data is once output to the off area, the back gate signal (e.g., the second back gate signal BS2) corresponding to the off area may be increased from the normal level to the inactive level VPOFF greater than the normal level (operation S40).

When the back gate signal (e.g., the second back gate signal BS2) increases from the normal level to the inactive level VPOFF, it is determined whether the increased back gate signal (e.g., the second back gate signal BS2) exceeds a maximum back gate voltage (operation S45).

When the display panel 100 is folded and the increased back gate signal (e.g., the second back gate signal BS2) does not exceed the maximum back gate voltage, at least one of the gate driver 300, the data driver 500, or the emission driver 600 may not output the driving signal to the off area (operation S50).

As explained above, when the display panel 100 is folded, the display apparatus may be operated in the partial driving mode (operation S60) through the operations S30, S40 and S50.

When the display apparatus is operated in the partial driving mode, the current of the pixel of the display panel 100 is sensed and it is determined whether the sensed current maintains the black data or not (operation S65).

When the sensed current does not maintain the black data, an inactive level of the back gate signal (e.g., the second back gate signal BS2) may be further increased (operation S67). When the sensed current increases, the level of the back gate signal (e.g., the second back gate signal BS2) may be controlled to display the black image on the display panel 100 instead of writing the black data.

When the back gate signal (e.g., the second back gate signal BS2) further increases, it is determined whether the increased back gate signal (e.g., the second back gate signal BS2) exceeds the maximum back gate voltage (operation S45).

When the back gate signal (e.g., the second back gate signal BS2) further increases and the increased back gate signal (e.g., the second back gate signal BS2) exceeds the maximum back gate voltage, the display defect of the display panel 100 may not be controlled by controlling the level of the back gate signal (e.g., the second back gate signal BS2) so that the data driver 500 may output the black data to the data line again (operation S30).

When the back gate signal (e.g., the second back gate signal BS2) further increases and the increased back gate signal (e.g., the second back gate signal BS2) does not exceed the maximum back gate voltage, the partial driving method may be maintained (operations S60 and S65).

According to some example embodiments, the independent back gate signals BS1 and BS2 are applied to the first back gate electrodes located in the first display area DA1 and the second back gate electrodes located in the second display area DA2 so that the pixels in the inactive area DA2 may be controlled not to emit the light. In addition, the gate driver 300 does not output the gate signal to the inactive area DA2, the data driver 500 does not output the data voltage to the inactive area DA2 and the emission driver 600 does not output the emission signal to the inactive area DA2 in a folded status of the display panel. Thus, the power consumption of the display apparatus may be reduced.

In addition, in the folded status of the display panel 100, the current of the pixel is sensed. When the luminance of the pixel increases due to the leakage of the current of the pixel, the second back gate signal may be increased or the black data may be output again to the inactive area.

In addition, the supplementary buffer PA commonly connected to the data lines is used to output the black data to the inactive area so that the power consumption of the display apparatus may be further reduced.

According to the present inventive concept as explained above, the power consumption of the foldable display apparatus may be reduced.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

The foregoing is illustrative of embodiments according to the present inventive concept and is not to be construed as limiting thereof. Although some example embodiments of the present inventive concept have been described, those skilled in the art will readily appreciate that many modifications are possible in the example embodiments without materially departing from the novel teachings and characteristics of the present inventive concept. Accordingly, all such modifications are intended to be included within the scope of the present inventive concept as defined in the following claims and their equivalents. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific example embodiments disclosed, and that modifications to the disclosed example embodiments, as well as other example embodiments, are intended to be included within the scope of the appended claims and their equivalents. The present inventive concept is defined by the following claims, with equivalents of the claims to be included therein.

What is claimed is:

1. A display apparatus comprising:
- a display panel comprising a first display area, a second display area, a first back gate signal applying line connected to back gate electrodes of pixels in the first display area and a second back gate signal applying line connected to back gate electrodes of pixels in the second display area;
- a power voltage generator configured to generate a first back gate signal applied to the first back gate signal applying line and a second back gate signal to the second back gate signal applying line;
- a gate driver configured to output a gate signal to a gate line of the display panel; and
- a data driver configured to output a data voltage to a data line fro among a plurality of data lines of the display panel,
- wherein the data driver is configured to output black data a single time to the data line when the display panel is folded, and
- wherein the second back gate signal increases from a normal level to an inactive level greater than the normal level and at least one of the gate driver, the data driver, or an emission driver does not output a driving signal to the second display area when the display panel is folded and after the black data is output the single time.

2. The display apparatus of claim 1, wherein a current of a pixel of the display panel is sensed when the display panel maintains a folded status, and
- wherein the data driver is configured to output the black data to the data line again in response to the sensed current not maintaining the black data.

3. The display apparatus of claim 2, wherein the data driver comprises:
- a plurality of main buffers respectively connected to the plurality of data lines; and
- a supplementary buffer commonly connected to the plurality of data lines.

4. The display apparatus of claim 3, wherein the data driver further comprises a plurality of switches, and
- wherein a switch of the plurality of switches is configured to selectively connect one of the main buffer and the supplementary buffer to the data line.

5. The display apparatus of claim 3, wherein the data driver is configured to output the black data to the data line again using the supplementary buffer when the sensed current does not maintain the black data.

6. The display apparatus of claim 1, wherein a current of a pixel of the display panel is sensed when the display panel maintains a folded status, and
- wherein a back gate signal generator is configured to increase the second back gate signal when the sensed current does not maintain the black data.

7. The display apparatus of claim 6, wherein the data driver is configured to output the black data to the data line again when the second back gate signal increases and the increased second back gate signal exceeds a maximum back gate voltage.

8. The display apparatus of claim 1, wherein the second back gate signal decreases from the inactive level to the normal level when the display panel is unfolded from a folded status.

9. A method of driving a display apparatus, the method comprising:
- outputting a first back gate signal to a first back gate signal applying line connected to back gate electrodes of pixels in a first display area of a display panel;
- outputting a second back gate signal to a second back gate signal applying line connected to back gate electrodes of pixels in a second display area of the display panel;
- outputting a gate signal to a gate line of the display panel; and
- outputting a data voltage to a data line of the display panel,
- wherein a data driver is configured to output black data a single time to the data line when the display panel is folded, and
- wherein the second back gate signal increases from a normal level to an inactive level greater than the normal level and at least one of a gate driver, the data driver, or an emission driver does not output a driving signal to the second display area when the display panel is folded and after the black data is output the single time.

10. The method of claim 9, wherein a current of a pixel of the display panel is sensed when the display panel maintains a folded status, and
- wherein the data driver is configured to output the black data to the data line again in response to the sensed current not maintaining the black data.

11. The method of claim 9, wherein a current of a pixel of the display panel is sensed when the display panel maintains a folded status, and
- wherein a back gate signal generator is configured to increase the second back gate signal when the sensed current does not maintain the black data.

12. The method of claim 11, wherein the data driver is configured to output the black data to the data line again when the second back gate signal increases and the increased second back gate signal exceeds a maximum back gate voltage.

13. The method of claim 9, wherein the second back gate signal decreases from the inactive level to the normal level when the display panel is unfolded from a folded status.

* * * * *